(12) United States Patent
Huang et al.

(10) Patent No.: US 12,425,408 B1
(45) Date of Patent: Sep. 23, 2025

(54) OFFLINE RISK MANAGEMENT PIPELINE

(71) Applicant: Block, Inc., San Francisco, CA (US)

(72) Inventors: Jianhua Huang, Cedar Park, TX (US); Anthony Miller, Chicago, IL (US); Andrew Ng, San Francisco, CA (US); Jason Sandifer, Saint Louis, MO (US); Isaac Tamblyn, Ottawa (CA); Norman Truong, Sunnyvale, CA (US); Michael Woods, San Francisco, CA (US); Yun Zhou, South Morang (AU)

(73) Assignee: Block, Inc., Oakland, CA (US)

( * ) Notice: Subject to any disclaimer, the term of this patent is extended or adjusted under 35 U.S.C. 154(b) by 282 days.

(21) Appl. No.: 17/889,048

(22) Filed: Aug. 16, 2022

(51) Int. Cl.
*H04L 9/40* (2022.01)
*G06N 3/084* (2023.01)

(52) U.S. Cl.
CPC .......... *H04L 63/102* (2013.01); *G06N 3/084* (2013.01); *H04L 63/1416* (2013.01); *H04L 63/1425* (2013.01)

(58) Field of Classification Search
CPC ............... H04L 63/102; H04L 63/1416; H04L 63/1425; G06N 3/084
See application file for complete search history.

(56) References Cited

U.S. PATENT DOCUMENTS

| | | | |
|---|---|---|---|
| 11,816,550 B1 * | 11/2023 | Gupta | G06N 5/01 |
| 2015/0188941 A1 * | 7/2015 | Boshmaf | H04L 63/1441 726/22 |
| 2018/0033089 A1 * | 2/2018 | Goldman | H04L 63/102 |
| 2018/0124105 A1 * | 5/2018 | Rodrigues | H04L 63/14 |
| 2019/0005408 A1 * | 1/2019 | Tolpin | G06N 20/00 |
| 2019/0236249 A1 * | 8/2019 | Pavlou | G06F 21/554 |
| 2020/0065814 A1 * | 2/2020 | Fang | G06Q 20/4014 |
| 2021/0157945 A1 * | 5/2021 | Cobb | G06F 21/32 |
| 2021/0200955 A1 * | 7/2021 | Ben Kimon | G06N 3/044 |

(Continued)

OTHER PUBLICATIONS

Pandey, Ayushi; Jaiswal, Harsh; Vij, Aanchal; Mehrotra, Tushar; "Case Study on Online Fraud Detection using Machine Learning," 2nd International Conference on Advance Computing and Innovative Technologies in Engineering (ICACITE), Greater Noida, India, Apr. 28-29, 2022, pp. 48-52.*

(Continued)

*Primary Examiner* — Victor Lesniewski
(74) *Attorney, Agent, or Firm* — IP Spring

(57) ABSTRACT

A risk management server may apply a trained risk model to a plurality of user accounts maintained by a service provider to identify a plurality of suspicious user accounts. The risk management server may suspend each of the identified suspicious user accounts from using one or more features provided by the service provider. The risk management server may cure one or more of the suspended user accounts responsive to a successful response to a challenge presented to a user associated with each of the suspended accounts. The risk management server may confirm that each of the uncured suspended user accounts is fraudulent after a period of time without being cured. The risk management server may create training data including the cured user accounts labeled as not fraudulent and the confirmed user accounts labeled as fraudulent. The risk management server may re-train the risk model using the training data.

14 Claims, 11 Drawing Sheets

(56) References Cited

U.S. PATENT DOCUMENTS

| | | | | |
|---|---|---|---|---|
| 2021/0397972 | A1* | 12/2021 | Walters | G06N 3/047 |
| 2022/0198322 | A1* | 6/2022 | Kuperman | G06N 20/00 |
| 2023/0177512 | A1* | 6/2023 | Laptiev | G06Q 20/4016 |
| | | | | 705/44 |
| 2023/0259631 | A1* | 8/2023 | Zawadzki | G06N 20/10 |
| | | | | 726/22 |
| 2023/0385836 | A1* | 11/2023 | Hughes | G06Q 20/4016 |

OTHER PUBLICATIONS

Shinde, Shruti; Mane, Sunil B.; "Malicious Profile Detection on Social Media: A Survey Paper," 9th International Conference on Reliability, Infocom Technologies and Optimization (Trends and Future Directions) (ICRITO), Noida, India Sep. 3-4, 2021, pp. 1-5.*

* cited by examiner

OFFLINE RISK MANAGEMENT PIPELINE

TECHNICAL FIELD

In a large-scale database and server, fraudulent accounts are difficult to detect. The monitoring of account activities for fraud detection is resource-intensive and may slow down the operation of a server.

Figure 1:
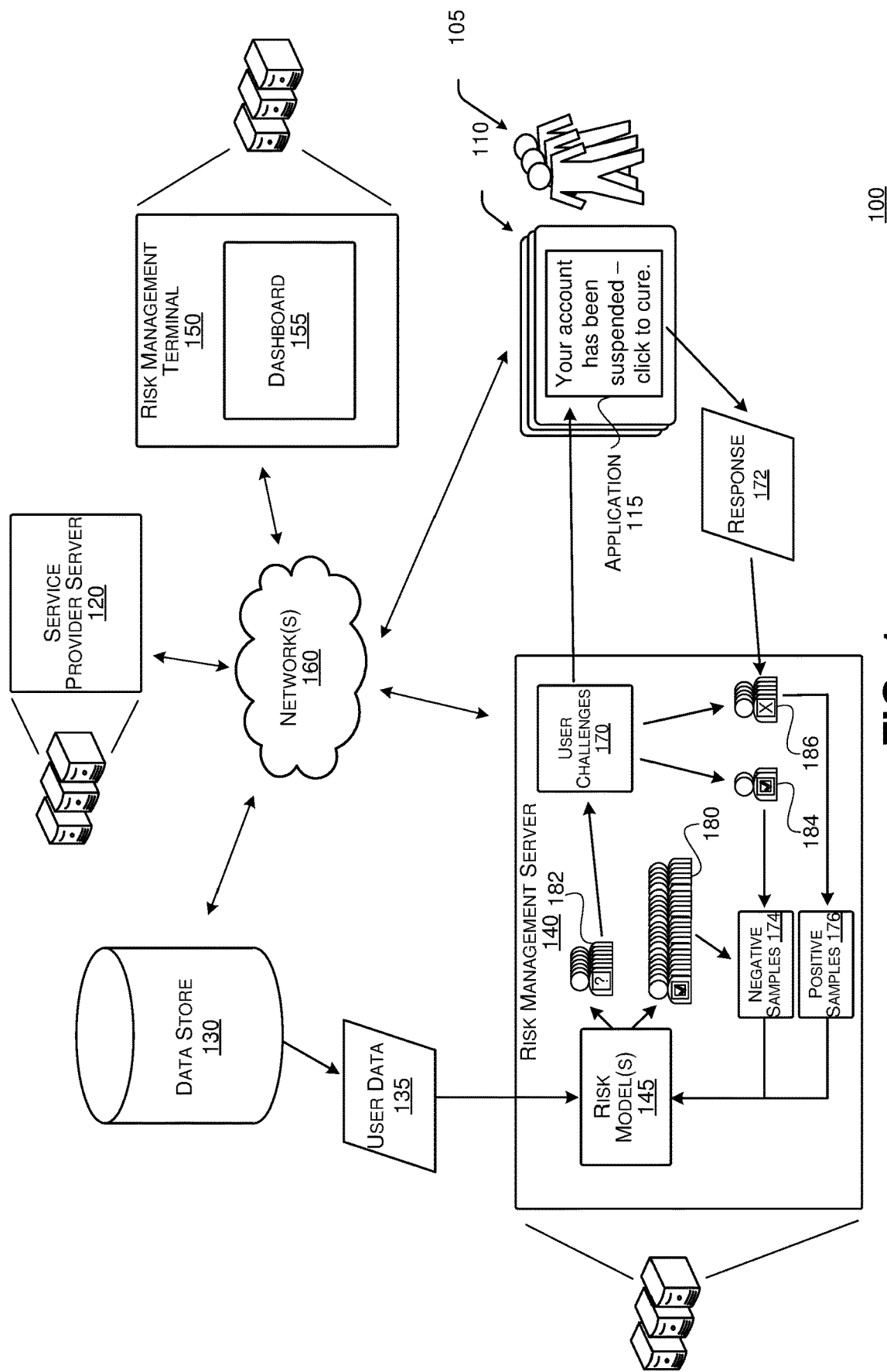
(FIG. 1 is a block diagram that illustrates a system environment of an example risk management server, in accordance with some embodiments.

The figures depict, and the detailed description describes, various non-limiting embodiments for purposes of illustration only.

DETAILED DESCRIPTION

Embodiments are related to automatic generation of high-quality training samples for identifying fraudulent accounts using a machine learning model and/or automatic bulk suspension of suspicious accounts in a service provider server. In some embodiments, a service provider server may provide various services to users who have accounts with the service provider server. Some of the accounts may be fraudulent, the detection of which has become increasingly more difficult as fraudsters become more and more intelligent. A risk management server, which may be associated with the service provider server or be part of the service provider service, may train and/or a machine learning model to identify suspicious accounts that have a high likelihood (e.g., above a threshold) to be fraudulent. Those accounts, or portions thereof, may be temporarily suspended while the account holders are notified and offered opportunities to cure the accounts. The risk management server may generate training samples using those suspended accounts for training and/or re-training of the machine learning model. For example, accounts that are successfully cured can be high-quality training samples of accounts that are non-fraudulent and suspended accounts that fail to pass one or more challenges to cure the accounts can be high-quality training samples of accounts that are considered to be fraudulent. The risk management server may also determine the cure rate (e.g., a number of temporarily suspended accounts that are cured via one or more actions of associated users in view of the total number in a batch of temporarily suspended accounts) of a batch of temporarily suspended accounts to monitor the accuracy of the machine learning model in identifying fraudulent accounts. In some examples, in response to the cure rate being low (e.g., below a threshold), which may indicate that the machine learning model is quite accurate, the risk management server may automatically deactivate those suspended accounts in bulk.

In an example, the identification of suspicious accounts by a machine learning model may be performed in an offline manner, such as by running the model at a time other than when a transaction or other interaction has been initiated, is in process, or is about to be completed. This allows the risk management server to perform an offline bulk suspension and/or bulk deactivation. In some cases, offline bulk suspension or bulk deactivation therefore does not need to rely on any active triggers, thereby allowing the risk management server to suspend a user, or group of users, even before the user, or group of users, makes any transactions or interactions, such as before the user, or group of users, using the application solicits any cash payment or money transfer. As such, instead of or in addition to, acting in real time at the time of a transaction or other interaction, the risk management server may remove bad actors ahead of time. That is, techniques described herein enable suspension and/or deactivation to occur without reliance on a trigger. This enables the detection and suspension and/or deactivation of user accounts, or portions thereof, before bad actors engage in fraudulent activity, thereby removing fraudulent accounts and associated activity proactively before such accounts and/or activity utilize processing and/or computing resources. In some embodiments, an offline model may be scheduled to run at a low traffic period when computing resources and network bandwidth are more efficient to improve the computation speed of the risk management server. Techniques described herein alleviate or reduce the need for the resource-intensive real time monitoring of fraudulent activity that can slow down the operations of servers. As such, techniques described herein offer improvements to existing techniques.

In some embodiments, an offline model may perform training and inference-making in batches. For example, the offline model may first be trained with an initial batch of training samples. The offline model may be set to make inference (e.g., identification of fraudulent accounts) periodically (e.g., every night, every week, etc.) and may be further trained (re-trained) when a new batch of training samples are available. The use of an offline model may improve the accuracy of decision-making because of the ability to use more input features, especially in some cases a real time decision-making model may face a bottleneck in fetching data from data sources to make fast enough decisions. For example, in a large-scale service provider server that provides various financial transactions among users and has a large number of accounts, the offline model may be run periodically (e.g., every night, every week, etc.) before a user is engaging or is about to engage in a transaction that may be fraudulent. Similar to account suspension, account deactivation may occur at any suitable time. In some cases, the confirmation of an account being fraudulent may occur in association with or after an activity associated with the account is identified as noncompliant. In other cases, the confirmation of an account being fraudulent may occur preemptively without the account performing any activities. The risk management server may use output inferences and confirmations (or lack thereof) for further training the offline model.

In conventional techniques, due to the variation in type and times associated with fraud, conventional techniques often lack high-quality training labels. As such, in existing techniques, models used for fraud detection are inaccurate and/or imprecise. This can result in suspension or deactivation of accounts that are legitimate accounts, thereby necessitating an unsuspension and/or reactivation process that utilizes computing resources and results in a poor user experience. As described herein, high-quality training samples that are generated not only may be used to further refine an existing model, but also to train other models (e.g., a XGBoost model) used for real-time scoring and customer representation. Models developed based on these high-quality labels can reach very high accuracy. That is, techniques described here provide significant improvement on suspension accuracy and significantly improve customer dissatisfaction due to mistaken suspension, for example when compared to alternative or conventional techniques. Such efficiencies and improved accuracy offer improvements over alternative or conventional techniques.

Oftentimes, fraudsters can easily switch from one transaction type to another, each of which warrants different models for detection. For example, in a payment service setting, a fraudster may start with fraudulent activities in peer-to-peer transfer, then move to stock gifting, then to cashing in account values. In such an example, a first model may be used for detecting peer-to-peer transfer fraud, a second model may be used for detecting stock gifting fraud, a third model may be used for cashing in account values, and so on. Techniques described herein offer improvements to existing techniques by training and/or using a model, trained using machine learning, for offline bulk suspension and bulk deactivation, which alleviates the aforementioned problem by using individual model to identify suspicious user accounts proactively, instead of using multiple models for different transaction types at the time of the transactions.

The use of offline account suspension models may provide a risk management server with more flexibility in model development than is the case with alternative models or conventional techniques. For example, outputs of a model can be standardized while the actual model structure or inputs can be flexible. In some embodiments, so long as a model can generate a list of suspicious customers to suspend, the use of offline account suspension model may be viable for performing bulk operations as described herein. As a result, the risk management server can explore various types of machine learning models (e.g., graph, convolutional neural network (CNN), transformer, natural language processing (NLP), generative adversarial network (GAN), reinforcement learning, and unsupervised clustering) for fraud detection. This also allows easier collaboration on model development that has the common goal of removing bad customers, for example, when compared to alternative models or conventional techniques. Different risk administrators can collaborate on developing models to remove fraudsters involved in multiple activities, for example, chargeback, scam, and referral abuse, at the same time.

Further, techniques described herein can leverage a suspension accuracy metric to perform automatic and/or bulk suspensions. In conventional techniques, fraudulent accounts can be identified and suspended as accounts are determined to be fraudulent (e.g., on a per account basis). Existing techniques utilize very manual processes. By monitoring the suspension accuracy metric, indicating the accuracy and/or precision of output(s) of the model based at least in part on cure rates, techniques described herein can determine when to perform suspensions automatically (e.g., without manual review) and/or in bulk (e.g., more than one at a time). For instance, when the suspension accuracy metric satisfies a threshold, suspensions can be performed by the risk management server automatically and/or in bulk. As such, techniques described herein offer improvements to existing technologies by enabling automated and/or bulk operations for an otherwise manual, resource-intensive process.

While techniques described herein make reference to fraud detection in association with a payment service provider, techniques described herein can be applicable to any service provider wherein fraud can be perpetuated. Further, in some examples, as described below, techniques described herein can be used to alert users of likely fraud attacks ahead of time, downgrade risky users to limit their access to features or functionality (e.g., users determined to be risky cannot participate in high-dollar transactions, referrals, cryptocurrency or investing transactions, etc.), or the like.

The figures (FIGS.) and the following description relate to embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

FIG. (FIG. 1 is a block diagram that illustrates a system environment 100 of an example risk management server, in accordance with some embodiments. By way of example, the system environment 100 includes users 105 controlling user device 110, a service provider server 120 that provides various services (e.g., on and/or offline services), a data store 130, a risk management server 140 that includes one or more risk models 145, and a risk management terminal 150 with a dashboard 155. The entities and components in the system environment 100 communicate with each other through the network(s) 160. In various embodiments, the system environment 100 may include different, fewer, or additional components. The components in the risk management system environment 100 may each correspond to a separate and independent entity or may be controlled by the same entity. For example, in some embodiments, the service provider server 120 and the risk management server 140 may be controlled by the same entity.

While each of the components in the risk management system environment 100 may at times be described in this disclosure in a singular form or a plural form, the system environment 100 may include one or more of each of the components. For example, there can be multiple user devices 110 communicating with the service provider server 120. Also, the service provider server 120 may provide service for multiple users 105 even though the example used may refer the users to as "a user." While a component is described in a singular form in this disclosure, it should be understood that in various embodiments the component may have multiple instances. Hence, in the system environment 100, there can be one or more of each of the components.

A user device 110 may also be referred to as a client device. A user device 110 may be controlled by a user, who may be a service provider's customer that receives one or more features provided by the service provider. A user 105 may access a feature provided by the service provider through one or more devices or servers provided by the service provider server 120. The features provided by the service provider may include activities that are carried out at the service provider server 120, services provided by the service provider server 120, peer-to-peer services facilitated by the service provider server 120, and other services that involve a third-party system (not shown in FIG. 1) such as a third-party server or a blockchain. The user device 110 may be any computing device. Examples of user devices 110 include personal computers (PC), desktop computers, laptop computers, tablet computers, smartphones, wearable electronic devices such as smartwatches, or any other suitable electronic devices. The user 105 may access the feature(s) provided by the service provider via an application (e.g., a software application), a portion of an application (e.g., an instant application), a webpage, or the like availed via the user device 110. In some examples, when the user 105 accesses the feature(s) provided by the service provider via an application 115, the application 115 can be provided by the service provider. In some examples, the application 115 can avail a variety of services. In some examples, the application 115 can be specially configured to provide a particular type of services, for example, such as banking, mobile payments, payment processing, content streaming, content creation, or the like.

A service provider server 120 may be operated by a software company that provides various types of service providers. In providing those services, the service provider server 120 may distribute different devices (e.g., computing devices, point-of-sale (POS) devices) and publish various types of software applications, such as the application 115 that may be installed at a user device 110, an autonomous application that may be a decentralized application that is run on a decentralized network, and an autonomous program protocol that is recorded on a blockchain. Various autonomous applications may be referred to as Web3 applications. The nature of services provided by the service provider server 120 may vary in different embodiments. For example, in some embodiments, the service provider server 120 provides a POS system to various merchants and the users 105 may be the merchants and the merchants' customers. In some embodiments, the service provider server 120 provides mobile payment services to various users 105 that allow the users to complete transactions and send payments to other users and third parties. In some embodiments, the service provider server 120 provides content streaming services and services related to blockchains such as transactions involving non-fungible tokens (NFTs). Various non-limiting examples of the services and more detailed system environments of the service provider server 120 are discussed in FIG. 5 through FIG. 8, but those examples are not exhaustive examples of what the service provider server 120 may include and what features that the service provider server 120 provides.

The data store 130 includes one or more storage units such as memory that takes the form of non-transitory and non-volatile computer storage medium to store various data. The computer-readable storage medium is a medium that does not include a transitory medium such as a propagating signal or a carrier wave. The data store 130 may be used by the service provider server 120 to store data related to the service provider server 120, such as user profiles of various user accounts, activity records related to those user accounts, and other metadata. The data store 130 may also store the relationships among the users 105, such as past transactions among the user accounts, contacts stored in user accounts, and messaging history among the user accounts. In some embodiments, there may be more than one data store 130 and one of the data stores 130 may be a third-party data provider that allows the service provider server 120 to verify certain information related to the users 105. For example, in some embodiments, a data store 130 may take the form of a financial institute data store that stores debit card, credit card, or other credit information. The financial institute data store allows the service provider server 120 to verify a user's identity through verifying debit card information or other credit information. In some embodiments, a data store 130 may take the form of a third-party server that allows a user 105 of the service provider server 120 to link the user's bank information to the service provider server 120, which may verify the bank information through the data store 130.

In one embodiment, the data store 130 communicates with other components by the network(s) 160. This type of data store 130 may be referred to as a cloud storage server. Example cloud storage service providers may include AMAZON AWS, DROPBOX, RACKSPACE CLOUD FILES, AZURE BLOB STORAGE, GOOGLE CLOUD STORAGE, etc. In another embodiment, instead of a cloud storage server, the data store 130 may be a local storage device that is controlled and connected to the service provider server 120. For example, the data store 130 may take the form of memory (e.g., hard drives, flash memory, discs, ROMs, etc.) used by the service provider server 120 such as storage devices in a storage server room that is operated by the service provider server 120.

The risk management server 140 may be a server that monitors the transactions and user accounts associated with the service provider server 120 and identifies potentially fraudulent activities or accounts. In some embodiments, the risk management server 140 and the service provider server 120 may be the same server. In other embodiments, the risk management server 140 and the service provider server 120 are different servers.

The risk management server 140 may use one or more risk models 145 to identify fraudulent activities or accounts. In various embodiments, a user 105 may be associated with one or more user accounts maintained by a service provider provided by the service provider server 120. While many of the users 105 are legitimate, there can be different kinds of fraudulent accounts created on the service provider server 120. The identification of fraudulent activities or accounts may include detection, such as being reactive to a suspicious activity or the creation of a suspicious account, and prediction, such as flagging in advance potentially fraudulent activities or suspending potentially fraudulent accounts without an active trigger. A fraudulent account may be an account that has been created using fake or misappropriated information, an account that has committed an activity using fake information or activities, an account that has committed a noncompliant activity (e.g., a transaction that is against the terms of service of the service provider server 120, the law, or otherwise inappropriate or fraudulent) or is predicted by the risk management server 140 to commit any noncompliant activity, and/or the like. A fraudulent account in this context is therefore not limited to an account that is created fraudulently (e.g., using fake or misappropriated information). Likewise, a fraudulent activity may be any noncompliant activity and is not limited to those using fake information or activity.

In some embodiments, the risk management server 140 may apply a risk model 145 to identify potentially fraudulent user accounts and flag the user account as suspicious user accounts 182 while other user accounts that are not flagged by the risk model 145 are determined to be "legitimate" (e.g., non-fraudulent) accounts 180, at least for this round of determination. The suspicious user account 182 may be suspended for a period of time, or until another condition is satisfied, but is allowed for a user 105 to cure the suspension. For example, the service provider server 120 may notify the account users 105 regarding the suspension and invite the users 105 to cure the suspended user accounts by presenting challenges 170 to the users. Examples of challenges may include verification of social security numbers, identifying shared contacts, adding a trusted contact, performing a debit card review or verification, providing government identification, linking a real-world bank account or another trustworthy organization's account, linking a secondary alias, visiting an authorized seller and completing a transaction with the seller, creating an account with a trusted source, etc. If the suspicious user accounts 182 are not cured for a period of time, the risk management server 140 may confirm that the uncured suspended user accounts are fraudulent. The risk management server 140 may mark, flag, or otherwise indicate that the uncured accounts are deactivated user accounts 186 and may mark, flag, or otherwise indicate that the cured user accounts 184 are legitimate. In some examples, no marking, flagging, or other indication may be done for legitimate user accounts 184. The risk management server 140 may use various user accounts as training samples to train or re-train one or more risk models 145. For example, negative samples 174 may be generated by using the cured user accounts 184 and by sampling legitimate user accounts 180. Positive samples 176 may be generated by using the deactivated user accounts 186.

One or more risk models 145 may be applied to data associated with the user accounts maintained by the service provider server 120 to identify suspicious user accounts 182. In some embodiments, the risk management server 140 may use different risk model(s) 145 to identify various suspicious user accounts 182. In various embodiments, the risk model(s) 145 may take different forms. For example, the risk model(s) 145 may be rule-based models, heuristic models, tree-based models, and machine learning models, such as regression models, support vector machines (SVMs), random forest, deep learning models, reinforcement learning models, and unsupervised clustering algorithms. In some embodiments, multiple risk models 145 may cooperate to identify suspicious user accounts 182. In some embodiments, the risk models 145 may have standardized outputs that generate a list of suspicious user accounts 182. The inputs received by each risk model 145 may vary and may depend on the nature of the model.

In some embodiments, one or more risk models 145 may be online models while other risk models 145 may be offline models. An online model may be a model that carries out the identification of fraudulent activities or accounts (e.g., suspicious user accounts or activities) in real-time or near-real-time based on one or more triggering events. For example, when a transaction is initiated or about to be completed, an online model may receive the data associated with the transaction and contextual data related to the events that occurred at the transaction. The online model may make a determination in real-time or near-real-time to identify any activities or accounts involved in the transaction that may be fraudulent.

An offline mode may be a model that can be applied independently of a timing or trigger requirement. For example, in some embodiments, an offline model may be run periodically without any active triggers from any of the user accounts. That is, in some embodiments, an offline model may be run at a time other than when a transaction has been initiated, is in process, or is about to be completed. In some embodiments, an offline model may rely on the data used to create an account and/or transaction activity associated with the account (e.g., monitored in real time or near-real time) and may predict whether the account is fraudulent before the account performs any activities. In some embodiments, an offline model may be scheduled to run at a low traffic period when computing resources and network bandwidth are more efficient to improve the computation speed of the service provider server 120 and risk management server 140. In some embodiment, an offline model may perform training and inference in batches. For example, the offline model may first be trained with an initial batch of training samples. The offline model may be set to make inference (e.g., identification of fraudulent accounts) periodically (e.g., every night, every week, etc.) and may be further trained (re-trained) when a new batch of training samples are available. The use of an offline model may improve the accuracy of decision-making because of the ability to use more input features, especially in some cases a real-time decision-making model may face a bottleneck in fetching data from data sources to make fast enough decisions. For example, in a large-scale service provider server 120 that provides various financial transactions among users and has a large number of accounts, the offline model may be run periodically (e.g., every night, every week, etc.) before a user is engaging or is about to engage in a transaction that may be fraudulent. Similar to account suspension, account deactivation may occur at any suitable time. In some cases, the confirmation of an account being fraudulent may occur in association with or after an activity associated with the account is identified as noncompliant. In other cases, the confirmation of an account being fraudulent may occur preemptively without the account performing any activities. The service provider server 120 may use output inferences and confirmations (or lack thereof) for further training the offline model, as described above.

In some embodiments, one or more risk models 145 may be trained using training samples that may be actual accounts that have been confirmed as fraudulent or not. For example, account data in a training sample may be labeled as either fraudulent or legitimate. Supervised learning models or clustering models may be trained to predict whether those training samples are fraudulent or not. In some embodiments, the risk management server 140 may cooperate with the service provider server 120 to solicit high-quality training samples by using a curing mechanism to leverage users 105 to generate highly accurate training labels. For example, the risk management server 140 may automatically suspend a set of suspicious user accounts 182 using an existing risk model 145. Different attributes of the accounts and activities associated with the accounts may be used as input features for the risk model 145 to identify suspicious user accounts 182. Those accounts may be suspended in whole or in part (e.g., one or more features may not be accessible and/or the accounts may be flagged or otherwise tagged with an indication that the accounts, or particular features, are suspended) but are provided opportunities to be cured by having the users to complete one or more user challenges 170. If a user is able to cure the suspended account by successfully completing one or more challenges, the cured user account 184 can be used as a negative training sample 174 that is labeled as not fraudulent (legitimate). If no response is given or the user fails to cure the suspended account, the deactivated user account 186 can be used as a positive training sample 176 that is labeled as fraudulent. The user-labeled samples may be collected as a new batch to re-train the existing risk model 145 or another risk model 145. This user-driven sample labeling process generates high-quality training samples because the training samples are manually verified by the users who are motivated to fix any mistaken suspension. As such, models can be trained and further refined to become more accurate using those high-quality training samples.

While various servers, such as the service provider server 120 and the risk management server 140, may each be discussed in a singular form, a server in this disclosure may include one or more computers that include one or more processors and memory. The memory may store computer code that includes instructions. The instructions, when executed by one or more processors, cause the processors to perform one or more processes described herein. A server in this disclosure may take different forms. In some embodiments, a server is a single computer that executes code instructions directly. In some embodiments, the server is a group of computing devices that communicate with each other. The computing devices may be located geographically at the same (e.g., a server room) or different locations. In some embodiments, a server includes multiple nodes that operate in a distributed fashion such as in cloud computing or distributed computing. Each node may include one or more computing devices operating together. For example, in some embodiments, a server is decentralized and is operated by different nodes cooperatively to form the server. In some cases, a server may also include virtual machines. Any computing devices, nodes, virtual machines, singular or plural, may simply be referred to as a computer, a computing device, or a computing server. While in the example shown in FIG. 1, the service provider server 120 and the risk management server 140 are separate servers, in some embodiments, the service provider server 120 and the risk management server 140 may be a single server that performs various different tasks and processes described in this disclosure.

In some embodiments, the risk management terminal 150 may provide a platform for a risk administrator to review suspicious user accounts, suspended suspicious user accounts 182, individually or in bulk, and deactivate user accounts. For example, a user account may be added to a deactivated account list that results in a permanent deactivation unless the account is removed from the deactivated account list. In some embodiments, both suspension and deactivation of user accounts may be carried out in bulk. For example, with respect to suspension, the risk management server 140 may automatically identify a set of suspicious user activities and the risk management terminal 150 may provide a platform for a risk administrator to review a sampled subset of the suspicious accounts. In turn, the risk administrator may suspend the set of accounts in bulk. In some embodiments, those suspended accounts may be automatically deactivated unless some of the accounts are cured by the corresponding users 105. In some cases, the risk management terminal 150 may monitor a suspension accuracy metric, which monitors how accurate and/or precise the bulk suspension is, to determine whether the uncured suspended set of accounts can be automatically deactivated after the curing period expires. The automated bulk suspension and bulk deactivation improve the operation of the service provider server 120, especially a large-scale one which could potentially involve tens of millions or even hundreds of millions or more user accounts by allowing the service provider server 120 to perform automatic suspension and deactivation based on an objective metric and a reliable mechanism. The suspension or deactivation may be carried in one or more bulk operations. A bulk operation may automatically mark, flag, or otherwise indicate a batch (e.g., more than one) of user accounts as suspended or deactivated via a single action or input, thereby alleviating the need to suspend or deactivate account individually. This bulk suspension or deactivation can therefore provide efficiencies and improvements to existing techniques.

The risk management terminal 150 may be a computing device that includes a dashboard 155. The dashboard 155 may be the interface for the risk management server 140 and allow risk administrators to perform various actions associated with risk and account management of the service provider server 120. The dashboard 155 may also monitor the suspension accuracy metric. The dashboard 155 may take different forms. In one embodiment, the dashboard 155 is a software application interface. For example, the risk management server 140 may provide a front-end software application that can be displayed on a user device 110. In one case, the front-end software application is a software application that can be downloaded and installed on a user device 110 via, for example, an application store (App store) of the user device 110. In another case, the front-end software application takes the form of a webpage interface of the risk management server 140 that allows risk administrators to perform actions through web browsers. The front-end software application may include a graphical user interface (GUI) that displays various information and graphical elements. In another embodiment, dashboard 155 does not include graphical elements but communicates with the risk management server 140 via other suitable ways such as command windows or application program interfaces (APIs).

The communications among the user device 110, the service provider server 120, the risk management server 140, and the risk management terminal 150 may be transmitted via the network(s) 160, for example, via the Internet. In one embodiment, the network(s) 160 use standard communications technologies and/or protocols. Thus, the network(s) 160 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 160 can include multiprotocol label switching (MPLS), the transmission control protocol/ Internet protocol (TCP/IP), the User Datagram Protocol (UDP), the hypertext transport protocol (HTTP), the simple mail transfer protocol (SMTP), the file transfer protocol (FTP), etc. The data exchanged over the network 160 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network(s) 160 also includes links and packet switching networks such as the Internet.

Example Fraudulent Accounts Identification Processes

Figure 2A:
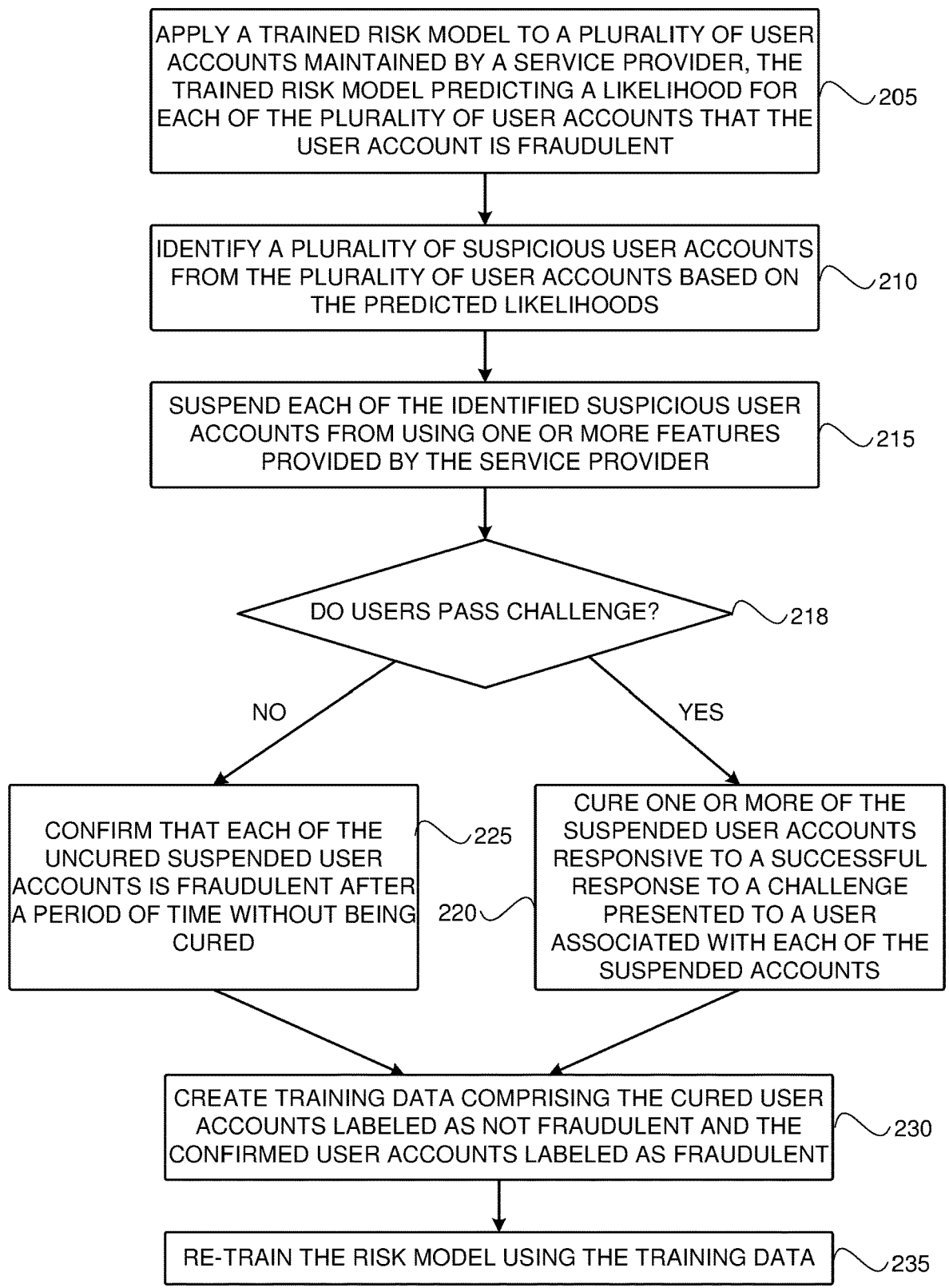
FIG. 2A is a flowchart depicting an example process for identifying fraudulent user accounts and adding those accounts to a deactivated account list, in accordance with some embodiments.
Figure 2B:
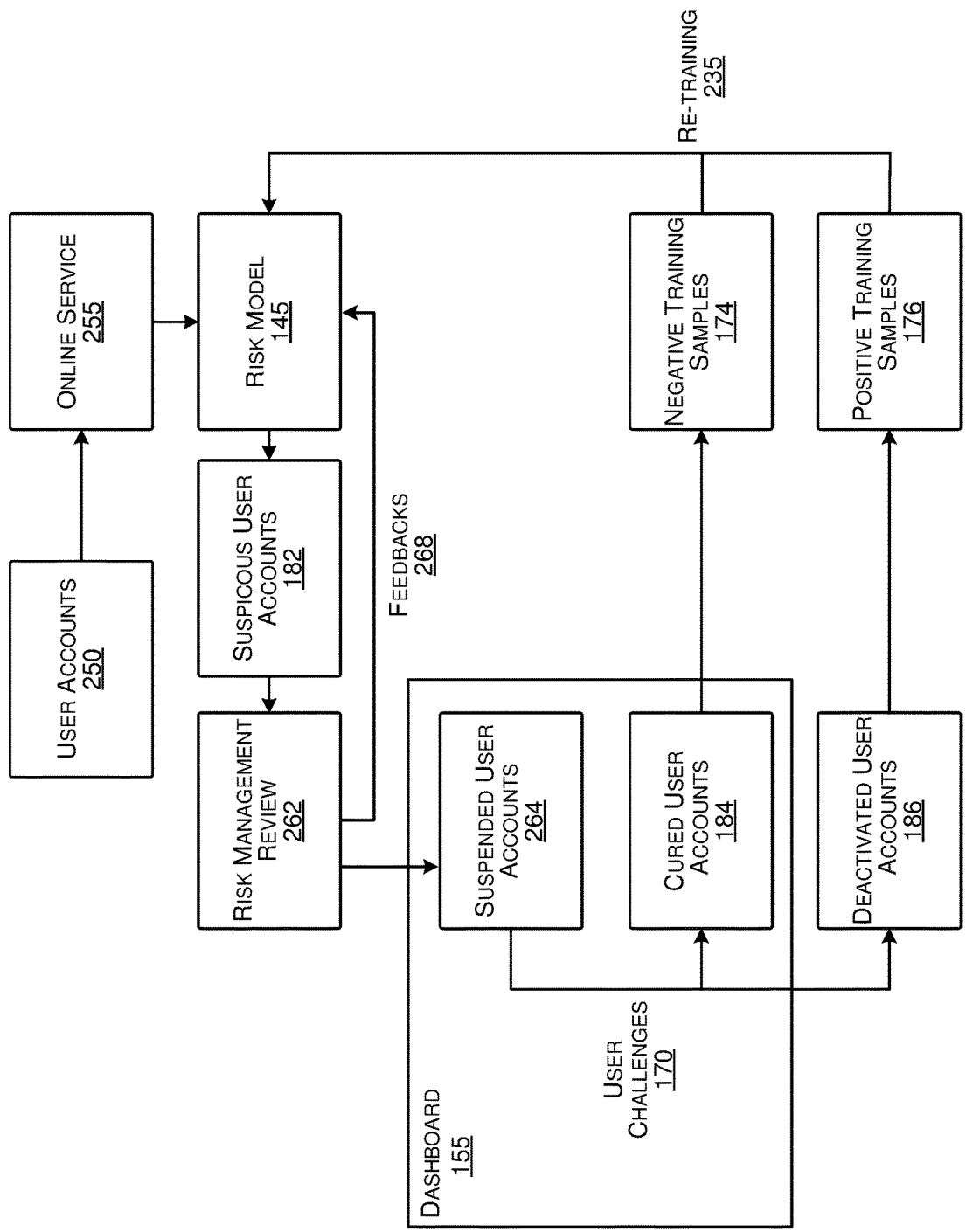
FIG. 2B is a block diagram that graphically illustrates the example process, in accordance with some embodiments.

FIG. 2A is a flowchart depicting an example process 200 for identifying fraudulent user accounts and training of a risk model, in accordance with some embodiments. FIG. 2B is a block diagram that graphically illustrates the example process 200, in accordance with some embodiments. FIG. 2A is discussed in conjunction with FIG. 2B. The process 200 may be performed by a computing device, such as the service provider server 120 or the risk management server 140. The process 200 may be embodied as a software algorithm that may be stored as computer instructions that are executable by one or more processors. The instructions, when executed by the processors, cause the processors to perform various steps in the process 200. While in this example the process 200 is discussed to be performed by risk management server 140, one or more steps may also be performed by the service provider server 120 or a server that serves as both the service provider server 120 and risk management server 140. One or more steps in FIGS. 2A and 2B may be skipped, added, or changed in various embodiments.

The risk management server 140 may apply 205 a trained risk model 145 to a plurality of user accounts 250 maintained by a service provider 255. The trained risk model 145 may predict a likelihood for each of the plurality of user accounts 250 that the user account 250 is fraudulent. A risk model 145 may be trained in batches or dynamically with additional training samples. For example, the trained risk model 145 may be a model that is trained with initial training samples.

In some embodiments, a risk model 145 may generate a likelihood that a user account 250 is fraudulent as part of the output or as an intermediate output of the model. A likelihood may take different forms in various embodiments. For example, the likelihood may be a statistical metric such as a probability value, a score that may be normalized or may be mapped to a function, or a label such as a binary label that predicts whether the user account 250 is fraudulent or not fraudulent (e.g., legitimate). In some embodiments, the risk model 145 may also output a list of connected users who are connected to the service provider server 120 via identification information such as phone numbers, email addresses, or other information provided by the users during onboarding and/or account management. The output may directly be the list of connected users without a score.

A trained risk model 145 may be used in different contexts and frequencies. In some embodiments, a risk model 145 may be an offline model that is applied periodically without active triggers from any of the user accounts. For example, the risk model 145 may not need an activity trigger from a user account before the risk model 145 predicting that the user account is fraudulent. In some embodiments, a model may take a few confirmed fraudulent accounts as input and identify similar suspicious accounts. For example, a risk administrator may run the risk model 145 in response to the risk administrator spotting a few "bad" customers in a fraud pattern and confirming that those customers are fraudulent. In some embodiments, fraudsters may create a number of fake accounts using the same or similar information within a short period and a risk administrator may spot a few "bad" accounts in exploratory reviews. In turn, the risk model 145 may be used to identify additional fake accounts that are similar to those spotted by the risk administrator. In some embodiments, the risk model 145 may be run without using any similar fake accounts as inputs. For example, the risk model 145 may be scheduled to run in a recurring manner at a certain time when the service provider server 120 is less busy to identify suspicious accounts. In some examples, the risk model 145 may run at the same time as or after an online risk model is run. The use of an offline risk model allows the identification of suspicious user accounts without relying on any active triggers, thus providing the opportunity for the risk management server 140 to suspend a user even before the user makes any transactions. The user of an offline risk model also allow the risk management server 140 to identify suspicious users in different types of transactions that may require different machine learning models to detect fraudulent activities if an online risk model is used. The use of offline account suspension model may allow a service server provider more flexibility in model development. For example, the outputs can be standardized while the actual model structure or inputs can be flexible.

The risk management server 140 may identify 210 a plurality of suspicious user accounts 182 from the plurality of user accounts 250 based on the predicted likelihoods. The identification of suspicious user accounts 182 may be performed directly by the risk model 145. For example, a list of suspicious accounts 182 may be the output of the risk model 145. In some embodiments, multiple risk models 145 may be used and the risk models 145 may have a unified output, which is a list of suspicious user accounts 182. In some embodiments, there may be no restriction on the exact type, structure, and rules associated with a model so that different types of models may be trained to identify suspicious user accounts 182. In some embodiments, those models may use different inputs (e.g., different machine learning model features, different input signals, different data sources) or no input at all to identify suspicious user accounts 182. The output of those models may be standardized to be a list of user account identifiers. The use of a risk model 145 allows the risk management server 140 to automatically identify suspicious user accounts, thereby allowing a server to provide services in a large scale while managing the operation of the server effectively.

The risk management server 140 may suspend 215 each of the identified suspicious user accounts from using one or more features provided by the service provider 255. In some examples, all features associated with a suspicious user account may be suspended or otherwise not accessible to the suspicious user accounts. In some examples, a subset of features may be suspended or otherwise not accessible to the suspicious user accounts. The list of suspicious user accounts 182 may be automatically suspended, suspended in bulk after a sampled review, or suspended individually. For example, in some embodiments, the risk management server 140 receives the list of suspicious user accounts 182 from the risk model 145 and unconditionally suspends those accounts.

In some embodiments, the risk management server 140 may transmit data related to the plurality of suspicious user accounts to a manual review, such as the risk management review 262, before the suspicious user accounts are suspended. In response to the manual review determining that at least a subset of the identified suspicious user accounts are likely fraudulent, the suspicious user accounts identified by the risk model 145 may be suspended in bulk. For example, the risk management server 140 provides the suspicious user accounts 182 or a sampled subset of those accounts for a risk management review 262. The risk management review 262 may be part of quality control of the output of the risk model 145 and may be carried out manually by risk administrators who may review the account profile data, activity records, activity patterns and other suitable information in determining whether the suspicious user accounts should be suspended. If the risk management review 262 determines that the samples should be suspended, the risk management server 140 may perform a bulk suspension of the rest of the suspicious user accounts 182 identified. In some embodiments, the account suspension may be performed automatically and/or without the risk management review 262. In some examples, such automatic account suspension can utilize a computing component to analyze account profile data, activity records, activity patterns, and/or other suitable information to determine whether to suspend an account, or a portion thereof. In some examples, one or more rules, thresholds, conditions, and/or machine-trained model(s) can be used to perform such an analysis.

In some embodiments, the risk management server 140 may monitor the model accuracy before a bulk suspension is carried out. For example, the risk management review 262 may suspend suspicious user account 182 manually. The suspicious user accounts identified by the risk model 145 may be further reviewed by the risk management review 262. If the manual review determines that the portion of suspicious accounts being fraudulent is above a threshold, the risk management server 140 may perform a bulk suspension to the suspicious user accounts 182 identified by the risk model 145. In some embodiments, a bulk-suspension identifier may be assigned to those suspended user accounts 264 in the same batch. The bulk-suspension identifier may be used to track the batch and may be used for reverse suspension in bulk in certain situations.

In some embodiments, the risk management review 262 may also provide feedback 268 to the risk model 145 to improve the model performance, such as by adding a filter to the user list to reduce false positives. The risk management review 262 may also label the sample taxonomy (e.g., authorized or unauthorized) so that other modelers can reuse these positive labels after the users are suspended and deactivated.

A suspended account may have one or more features that are suspended or otherwise not accessible that are accessible to a non-suspended account. In some embodiments, the suspension may be specific to a subset of features offered by the service provider 255 instead of blocking all features. In various embodiments, what features are suspended may depend on the nature of the service provider 255. In some examples, the features suspended can be associated with particular levels of risk, for example, of the user or individual features. In some embodiments, the features may include account transactions using the service provider 255, peer-to-peer transactions, blockchain-related transactions, and music streaming transactions. In some embodiments, the service provider 255 includes mobile payment services. The features suspended may include card-related transactions, peer-to-peer payment transactions, cash in operations, investing, and cryptocurrency transactions. In some embodiments, the service provider 255 includes POS services. The features suspended may include card payment and other financial transactions. In some embodiments, the full account is suspended. In some embodiments, the suspended user features of a suspended user account 264 may be in one or more categories, such as suspension of cash card transactions, suspension of peer-to-peer transaction, suspension of cash in, suspension of investing buys, suspension of cryptocurrency transactions, etc.

In some embodiments, the suspension and the later potential deactivation may also block new accounts that contain similar or same information as the suspended/deactivated accounts. For example, the risk management server 140 may identify one or more identifiers associated with each of the identified suspicious user accounts 182. The risk management server 140 may block new accounts associated with those identifiers from creation. The identifiers could be real-life identity information (e.g., names, addresses, social security numbers, credit card numbers, bank account numbers), IP addresses, device identifiers, or other suitable identifiers.

The risk management server 140 may present challenges 170 to the users associated with the suspended user accounts 264 and determine whether the users pass the challenge 170 at decision stage 218. The risk management server 140 may cure 220 one or more of the suspended user accounts 264 responsive to a successful response to a challenge 170 presented to a user associated with each of the suspended user accounts 264. For example, the risk management server 140 may provide notifications to users whose accounts are suspended that their accounts are temporarily suspended. A suspension notification may provide or link to a process that allows the user, or an agent acting on behalf thereof (e.g., a trusted contact), to verify the user account by successfully responding to one or more challenges 170. The challenges 170 may include verification of social security numbers, sharing contacts with the service provider, identifying shared contacts, adding a trusted contact (e.g., a user whose contact information has been provided by another user 105 and/or with whom a designation as "trusted" has been provided by another user 105), performing a debit card review or verification, providing government identification, linking a real-world bank account or another third-party (e.g., a trustworthy organization's, a related organization, an organization sharing a characteristic with the service provider, etc.) account, linking a secondary alias, visiting an authorized seller and completing a transaction with the seller, creating an account with a trusted source, etc. In some examples, an agent acting on behalf of the user 105 can complete a challenge, for example, by verifying the user 105, providing an indication that the user 105 is not fraudulent, and/or performing any of the challenges 170 provided above. The suspension and curing mechanism motivates genuine users to cure their accounts, thereby generating high-quality account samples that can be used as training samples to train a risk model.

In response to a user successfully responding to one or more challenges, the risk management server 140 un-suspend the user account. The un-suspended user account may be referred to as cured user accounts 184. In some embodiments, the risk management server 140 may add a cured user account 184 to an cured account list. In some embodiments, the cured account list may have an expiration date (e.g., 1 month) to prevent a cured user account subsequently becoming fraudulent from continuing to stay on the cured account list. The cured account list prevents the cured user account 184 from being deactivated due to being identified by the trained risk model 145. In some embodiments, the cured account list prevents the cured user account 184 from being suspended for a period of time after the cured user account 184 is added to the cured account list. In some embodiments, since it is highly likely that the cured user account 184 is legitimate, any attempt to suspend or deactivate the cured user account 184 may be overruled by the cured account list.

The risk management server 140 may confirm 225 that each of the uncured suspended user accounts is fraudulent after a period of time without being cured. The risk management server 140 may notify the users associated with the suspended user accounts 264 and set forth a deadline period of time for the suspended user accounts 264 to be cured. The risk management server 140 may receive no response at all from a user or receive a wrong answer to the user challenge 170 so that the risk management server 140 is unable to verify the user account 264. In either case, the risk management server 140 may determine that the suspended user accounts 254 are not cured. In turn, the risk management server 140 may deactivate the suspicious user accounts 182. The deactivated user accounts 186 may have one or more features deactivated permanently.

In some embodiments, the risk management server 140 provides a dashboard 155 for monitoring the suspension accuracy and allows a risk administrator to perform bulk suspension and deactivation. The risk management server 140 may monitor a suspension accuracy metric and displays the value of the metric for a batch of suspended user accounts 264 that are associated with the same bulk-suspension identifier. For example, a suspension accuracy metric may measure the accuracy of suspending each of the identified suspicious user accounts 264. The metric may measure, in the batch of suspended user accounts 264, what portion of those accounts are cured. The higher the cure rate, the lower the suspension accuracy. The risk management server 140 may perform actions based on the value of the suspension accuracy metric. For example, in response to the suspension accuracy metric being higher than a threshold that indicates a high accuracy, the risk management server 140 may deactivate the uncured suspended user accounts. In a high suspension accuracy setting, the risk management server 140 may deactivate those suspended user accounts automatically in bulk. The user accounts that are deactivated in the same batch may be assigned with a bulk-deactivation identifier. The bulk deactivation may be performed after the suspension accuracy metric maintains at higher than the threshold for a period of time. The bulk deactivation may be carried out in an offline manner. In some embodiments, if the suspension accuracy metric indicates that the suspension accuracy is medium, the risk management server 140 may refrain from performing any automatic or bulk deactivation and allows risk administrators to manually review accounts and make decisions. In some embodiments, if the suspension accuracy metric indicates that the suspension accuracy is low, the risk management server 140 may send an alert to risk administrators. The risk administrators may decide to unsuspend the suspended user accounts 264 in bulk based on the bulk-suspension identifier and may disable one or more risk models 145 or select a new risk model 145. While three tiers (high, medium, low suspension accuracy) are described, any number of tiers can be within the scope of this disclosure.

The monitoring of the suspension accuracy metric may allow the risk management server 140 to automatically apply one or more risk models 145 to scan user accounts 250 in a scheduled manner and automatically carry out bulk suspension and bulk deactivation with the mechanism that provides a cure period and notifications to suspended users to cure their suspended user accounts 264. If the suspension accuracy metric is maintained above a threshold (e.g., 90%), automatic model application, bulk suspension, and bulk deactivation may continue to be carried out without manual review or intervention. This speeds up the operation of the risk management server 140 and the service provider server 120, especially for the large-scale ones that can have tens of or even hundreds of millions of users. The generation of new high-quality training samples may also allow the entire pipeline illustrated in FIG. 2B to be fully automatic in continuously improving the risk models 145.

The deactivated user accounts 186 are blocked from one or more features provided by the service provider 255. In some embodiments, deactivated user accounts 186 have fewer features, if any features, available to them than suspended user accounts or non-suspended, active user accounts. In some embodiments, if the service provider 255 includes online payment services, the deactivated user accounts 186 may be prevented from peer-to-peer transactions, including cash payment or business payment. Any virtual or physical cards associated with those deactivated user accounts 186 may also be canceled. The credit balances for those deactivated user accounts 186 may also be downgraded to prevent new cards from generating for those accounts. Any instruments linked to those deactivated user accounts 186 may also be blocked. In some embodiments, the full account is deactivated. In some embodiments, the deactivated user features of a deactivated user account 186 may be in one or more categories, such as deactivation of card transactions, deactivation of peer-to-peer transaction, deactivation of cash in, deactivation of investing buys, deactivation of cryptocurrency transactions, etc.

Alternative to or in addition to account deactivation, the risk management server 140 may also mark suspicious and uncured user accounts as special and treat those accounts differently. In some embodiments, suspended and uncured user accounts may continue to perform one or more types of transactions with other users. However, the risk management server 140 may provide warnings to other legitimate accounts of elevated risk or potential fraud attacks before other legitimate accounts engage in transactions with those suspicious and uncured user accounts. The warnings may be sent in association with accounts that are not deactivated at all or with respect to categories of features that remain functional for deactivated accounts. In some embodiments, instead of completely deactivating a feature, the risk management server 140 may also reduce the privilege of the suspicious and uncured user accounts so that activities are limited in those accounts. For example, those accounts may be downgraded so that the accounts cannot perform high-dollar transactions, referral, or cryptocurrency purchases, etc.

The risk management server 140 may create 230 training data comprising the cured user accounts labeled as not fraudulent and the confirmed user accounts labeled as fraudulent. For example, the risk management server 140 may store profile data, activities records, and other account records of the cured user accounts 184 as the negative training samples 174 (samples that are labeled as not fraudulent) and may store those account records of the deactivated user accounts 186 as the positive training samples 176. Alternatively or additionally, negative training samples 174 may also be generated by randomly sampling accounts of the service provider server 120 that have never been suspended. The risk management server 140 may re-train 235 the risk model using the training data 174 and 176.

In some embodiments, the trained risk model 145 that is initially applied to identify the suspicious user accounts 182 is one of a plurality of risk models 145 used by the service provider 255 to identify suspicious user accounts 182. In some embodiments, the newly generated training data 174 and 176 are used to re-train 235 the original risk model 145. Alternatively or additionally, the newly generated training data 174 and 176 are used to train a second risk model in the plurality of risk models 145.

Training or re-training 235 of a risk model 145 using the training data may include applying, in a forward propagation of the risk model 145, the risk model 145 to the training data to generate fraudulent or non-fraudulent predictions. The fraudulent or non-fraudulent predictions may then be used to compare to the fraudulent or non-fraudulent labels in the training samples. In a backpropagation of the risk model 145, one or more parameters of the risk model 145 may be adjusted. Training of a model is discussed further in association with FIG. 4.

Example Automatic Suspension and Accuracy Monitoring Process

Figure 3A:
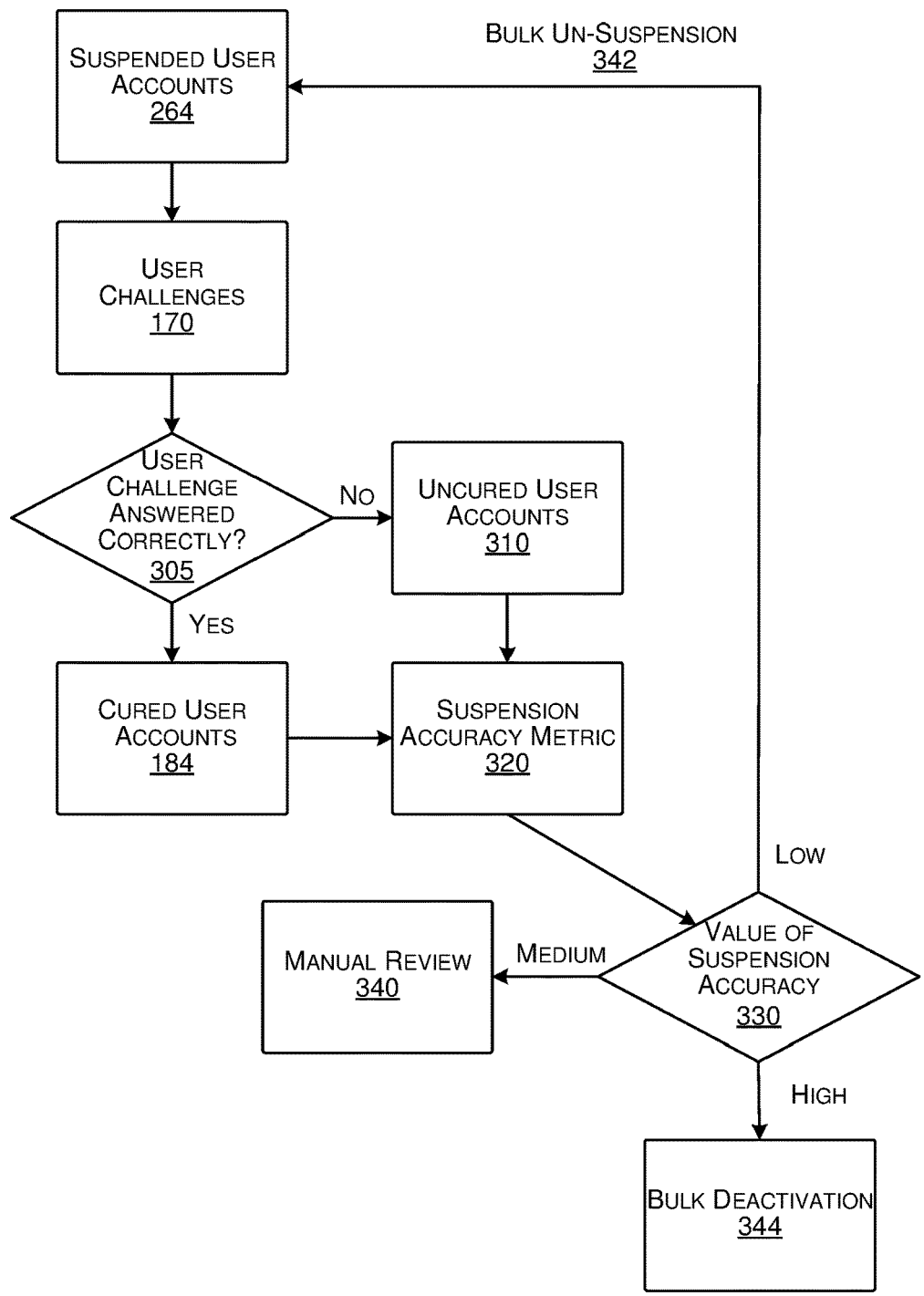
FIG. 3A is a flowchart depicting an example process for automatic suspension and deactivating user accounts and monitoring of the suspension accuracy, in accordance with some embodiments.

FIG. 3A is a flowchart depicting an example process 300 for automatic suspension and deactivation of user accounts and monitoring of the suspension accuracy, in accordance with some embodiments. The process 300 may be performed by a computing device, such as the service provider server 120 or the risk management server 140. The process 300 may be embodied as a software algorithm that may be stored as computer instructions that are executable by one or more processors. The instructions, when executed by the processors, cause the processors to perform various steps in the process 300. While in this example the process 300 is discussed to be performed by risk management server 140, one or more steps may also be performed by the service provider server 120 or a server that serves as both the service provider server 120 and risk management server 140. One or more steps in the process 300 may be skipped, added, or changed in various embodiments. In some embodiments, the process 300 is an example sub-process of the process 200.

The risk management server 140 may suspend user accounts based on the recommendations from one or more risk models to generate the suspended user accounts 264. For each of the suspended user accounts 264, the risk management server 140 may send a notification to the corresponding user and present a challenge 170 to the user. The challenge may include one or more questions related to the user or requesting the user to perform certain actions that can verify the user's identity and/or otherwise indicate that the user account is a legitimate user account. For example, the challenge 170 may include a verification of the social security number, identifying shared contacts, performing a debit card review or verification, providing government identification, linking a real-world bank account, etc.

At decision stage 305, the risk management server 140 may determine whether the user challenge was answered correctly and/or appropriate action was taken after a permissible cure period. In response to the challenge being answered correctly and/or appropriate action being taken, the risk management server 140 may un-suspend the suspended user account 264 and add the account to the cured user account 184. In response to the challenged being not answered correctly, which could include a wrong answer or a failure to respond, or an appropriate action being taken by the end of the permissible cure period, the risk management server 140 may mark the suspended user account 264 as one of the uncured user accounts 310.

In some embodiments, the risk management server 140 may determine a suspension accuracy metric 320 based on the number of cured user accounts 184 and the number of uncured user accounts 310. In some embodiments, the suspension accuracy metric 320 is determined with respect to a batch of suspended user accounts 264 that are suspended in bulk and have the same bulk-suspension identifier. In some embodiments, the suspension accuracy metric 320 may correspond to a measure of a number of cured user accounts 184 to a number of the uncured suspended user accounts 310 after a period of time, such as the permissible cure period or a portion thereof.

At decision stage 330, the risk management server 140 may determine the value of the suspension accuracy metric 320 and compare the suspension accuracy metric 320 to one or more thresholds. In response to the suspension accuracy metric 320 being lower than a first threshold that indicates the bulk suspension was performed quite inaccurately, the risk management server 140 may perform a bulk un-suspension 342. In response to the suspension accuracy metric 320 being between the first threshold and a second higher threshold that marks an accurate suspension operation, the risk management server 140 may determine that the suspension operation has a medium accuracy. The risk management server 140 may refrain from performing any automatic operation and may send data to risk administrators for manual review 340. In response to the suspension accuracy metric 320 being higher than the second threshold, which indicates that the bulk suspension was performed with high accuracy, the risk management server 140 may perform a bulk deactivation 344 by deactivating the uncured user accounts 310 after the cure period. In some examples, bulk suspension can be performed in waves (e.g., less than all of the suspended user accounts can be suspended at a first time, second time, third time, and so on) while the risk management server 140 monitors the suspension accuracy metric 320. In such examples, if the suspension accuracy metric 320 of a first wave satisfies a threshold or is otherwise associated with a low or medium accuracy, the risk management server 140 can manually review the first wave or reverse the suspension for all suspended user accounts before or instead of deactivating the second wave, third wave, and so on.

Figure 3B:
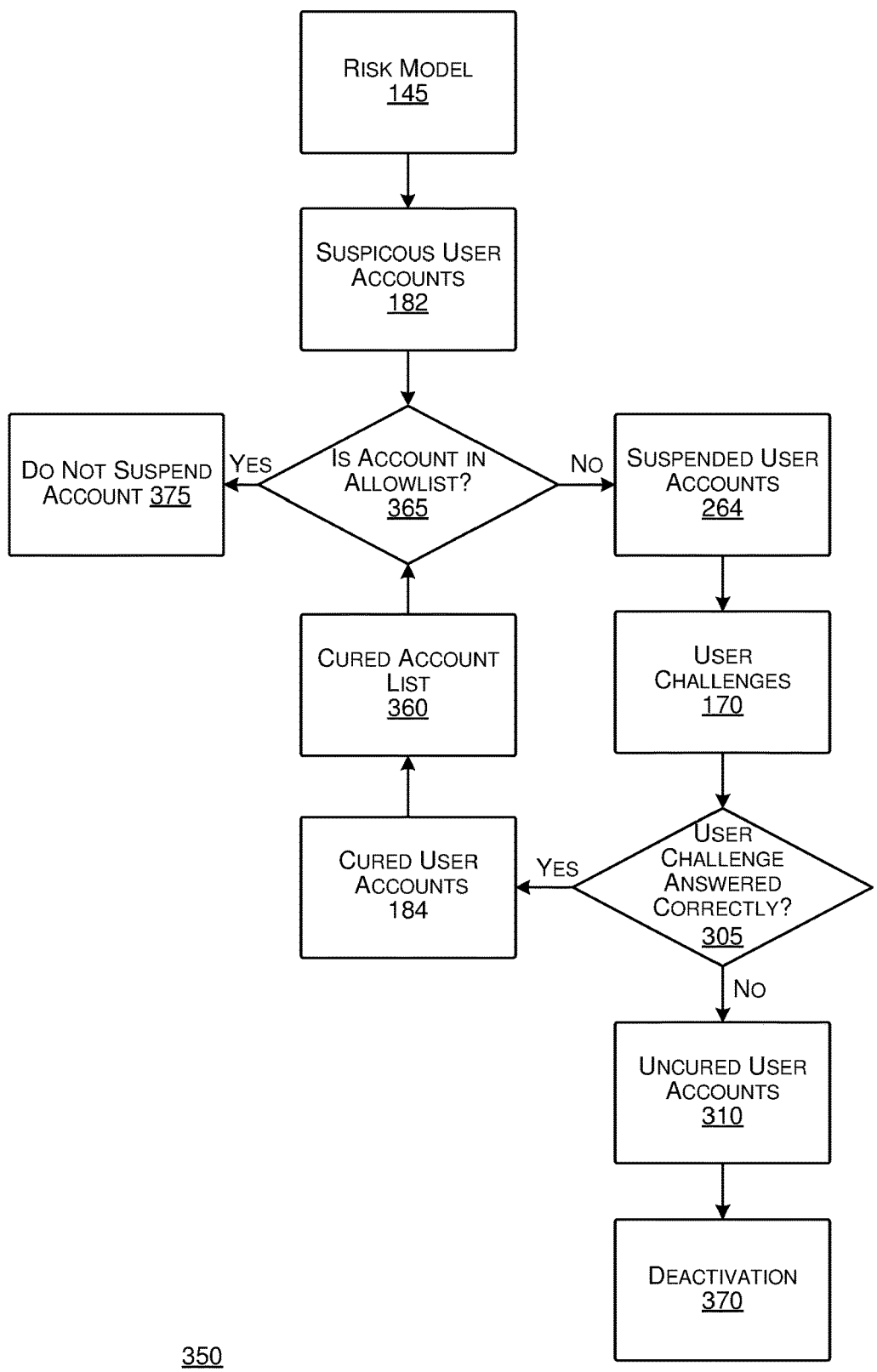
FIG. 3B is a flowchart depicting an example process for allowing and blocking user accounts for service providers, in accordance with some embodiments.

FIG. 3B is a flowchart depicting an example process 350 for allowing and blocking user accounts for service providers, in accordance with some embodiments. The process 350 may be performed by a computing device, such as the service provider server 120 or the risk management server 140. The process 350 may be embodied as a software algorithm that may be stored as computer instructions that are executable by one or more processors. The instructions, when executed by the processors, cause the processors to perform various steps in the process 350. While in this example the process 350 is discussed as being performed by risk management server 140, one or more steps may also be performed by the service provider server 120 or a server that serves as both the service provider server 120 and risk management server 140. One or more steps in the process 350 may be skipped, added, or changed in various embodiments. In some embodiments, the process 350 is an example sub-process of the process 200.

For the purpose of discussion, the block suspended user accounts 264 is discussed first. Similar to the process 300, the risk management server 140 may suspend user accounts based on the recommendations from one or more risk models to generate the suspended user accounts 264. For each of the suspended user accounts 264, the risk management server 140 may send a notification to the corresponding user and present a challenge 170 to the user.

At decision stage 305, the risk management server 140 may determine whether the user challenge was answered correctly or an appropriate action was otherwise taken after a permissible cure period. In response to the challenge being answered correctly, or an appropriate action being taken, the risk management server 140 may un-suspend the suspended user account 264 and add the account to the cured user account 184. In response to the challenge being not answered correctly, which could include wrong answer or a failure to respond, or an appropriate action not being taken by the end of the permissible cure period, the risk management server 140 may mark the suspended user account 264 as one of the uncured user accounts 310. The cured user accounts 184 may be added to the cured account list 360. Since the user accounts in the cured account list 360 have been manually verified by the users, those accounts have a high likelihood to be legitimate in the future. The cured account list 360 may override some suspension decisions of the risk management server 140 in the future. The uncured user accounts 310 may be deactivated 370.

Now turning to the top of the process 350, a risk model 145 may be applied to identify the suspicious user accounts 182. At the decision stage 365, the risk management server 140 may determine whether a suspicious user account 182 is in the cured account list 360. In response to the suspicious user account 182 being on the cured account list 360, the risk management server 140 will allow the suspicious user account 182 to continue to operate and will not suspend the account at step 375. In response to the suspicious user account 182 not being on the cured account list 360, the risk management server 140 suspends the account.

The cured account list 360 may also be implemented in the form of a metadata field that tracks whether an account has been suspended and successfully cured in the past. The use of cured account list prevents situations where users are repeatedly suspended in an unusual case where the accounts are repeatedly identified by the risk model 145 as suspicious. Tracking a successful cure allows the risk management server 140 to recognize that the user account should not be suspended again by the same risk model 145.

Example Machine Learning Models

In various embodiments, a wide variety of machine learning techniques may be used for various risk models 145. Examples include different forms of supervised learning, unsupervised learning, and semi-supervised learning such as decision trees, support vector machines (SVMs), regression, Bayesian networks, and genetic algorithms. Deep learning techniques such as embeddings, neural networks, including convolutional neural networks (CNN), recurrent neural networks (RNN) and long short-term memory networks (LSTM), may also be used. Supervised techniques such as clustering may also be used. Various risk models 145 that are used to predict a list of suspicious user accounts may apply one or more machine learning and deep learning techniques.

In various embodiments, the training techniques for a machine learning model may be supervised, semi-supervised, or unsupervised. In supervised learning, the machine learning models may be trained with a set of training samples that are labeled, such as the positive training samples 176 and the negative training samples 174 that are generated in the process 200. For example, for a machine learning model trained to predict if a user account is suspicious, the training samples may be known user accounts that labeled with fraudulent or not fraudulent. In some embodiments, the labels for each training sample may be binary or multi-class. In training a machine learning model for identifying fraudulent accounts, the training samples may include contextual data, past activities, and other account records of those user accounts. In some cases, an unsupervised learning technique may be used. The samples used in training are not labeled. Various unsupervised learning technique such as clustering may be used. For example, fraudulent account information may follow certain patterns and may be clustered together by an unsupervised learning technique. In some cases, the training may be semi-supervised with the training set having a mix of labeled samples and unlabeled samples. For example, some initial training sample accounts may be labeled as fraudulent as initial seeds, but a large number of other accounts may not be labeled.

A machine learning model may be associated with an objective function, which generates a metric value that describes the objective goal of the training process. For example, the training may intend to reduce the error rate of the model in predicting whether a user account is fraudulent. In such a case, the objective function may monitor the error rate of the machine learning model. Such an objective function may be called a loss function. Other forms of objective functions may also be used, particularly for unsupervised learning models whose error rates are not easily determined due to the lack of labels. In account prediction, the objective function may correspond to the difference between the model's predicted outcomes and the manual labels (such as those generated in step 230 of process 200) in the training sets. In various embodiments, the error rate may be measured as cross-entropy loss, L1 loss (e.g., the sum of absolute differences between the predicted values and the actual value), L2 loss (e.g., the sum of squared distances).

Figure 4:
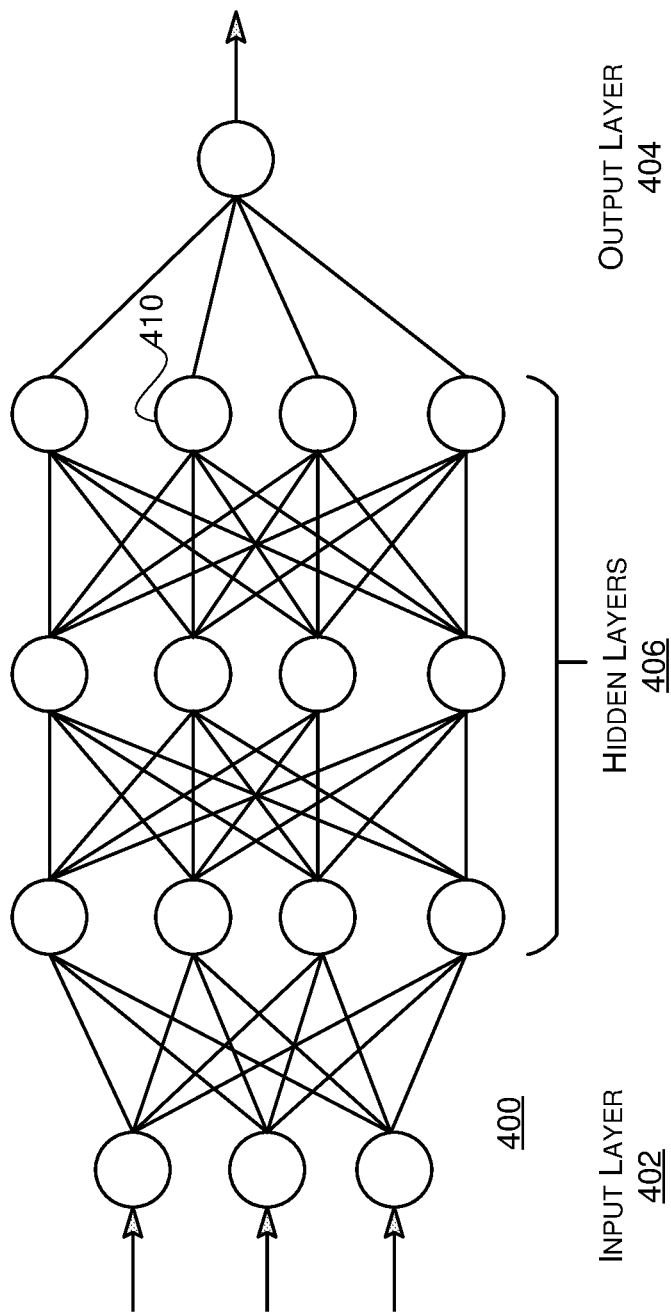
FIG. 4 is a conceptual diagram illustrating a structure of an example neural network, in accordance with some embodiments.

Referring to FIG. 4, a structure of an example neural network is illustrated, in accordance with some embodiments. While an example structure of a neural network is shown, the risk model 145 is not limited to be a neural network. The neural network 400 may receive an input and generate an output. The neural network 400 may include different kinds of layers, such as convolutional layers, pooling layers, recurrent layers, full connected layers, and custom layers. A convolutional layer convolves the input of the layer (e.g., an image) with one or more kernels to generate different types of images that are filtered by the kernels to generate feature maps. Each convolution result may be associated with an activation function. A convolutional layer may be followed by a pooling layer that selects the maximum value (max pooling) or average value (average pooling) from the portion of the input covered by the kernel size. The pooling layer reduces the spatial size of the extracted features. In some embodiments, a pair of convolutional layer and pooling layer may be followed by a recurrent layer that includes one or more feedback loop. The feedback may be used to account for spatial relationships of the features in an image or temporal relationships of the objects in the image. The layers and may be followed in multiple fully connected layers that have nodes connected to each other. The fully connected layers may be used for classification and object detection. In one embodiment, one or more custom layers may also be presented for the generation of a specific format of output. For example, a custom layer may be used for image segmentation for labeling pixels of an image input with different segment labels.

The order of layers and the number of layers of the neural network 400 may vary in different embodiments. In various embodiments, a neural network 400 includes one or more layers 402, 404, and 406, but may or may not include any pooling layer or recurrent layer. If a pooling layer is present, not all convolutional layers are always followed by a pooling layer. A recurrent layer may also be positioned differently at other locations of the CNN. For each convolutional layer, the sizes of kernels (e.g., 3×3, 5×5, 7×7, etc.) and the numbers of kernels allowed to be learned may be different from other convolutional layers.

A machine learning model may include certain layers, nodes, kernels and/or coefficients. Training of a neural network may include iterations of forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other images in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be iteratively performed. Training may be completed when the objective function has become sufficiently stable (e.g., the machine learning model has converged) or after a predetermined number of rounds for a particular set of training samples. The trained machine learning model can be used for performing prediction or another suitable task for which the model is trained.

Example Pos Server Environment

Figure 5:
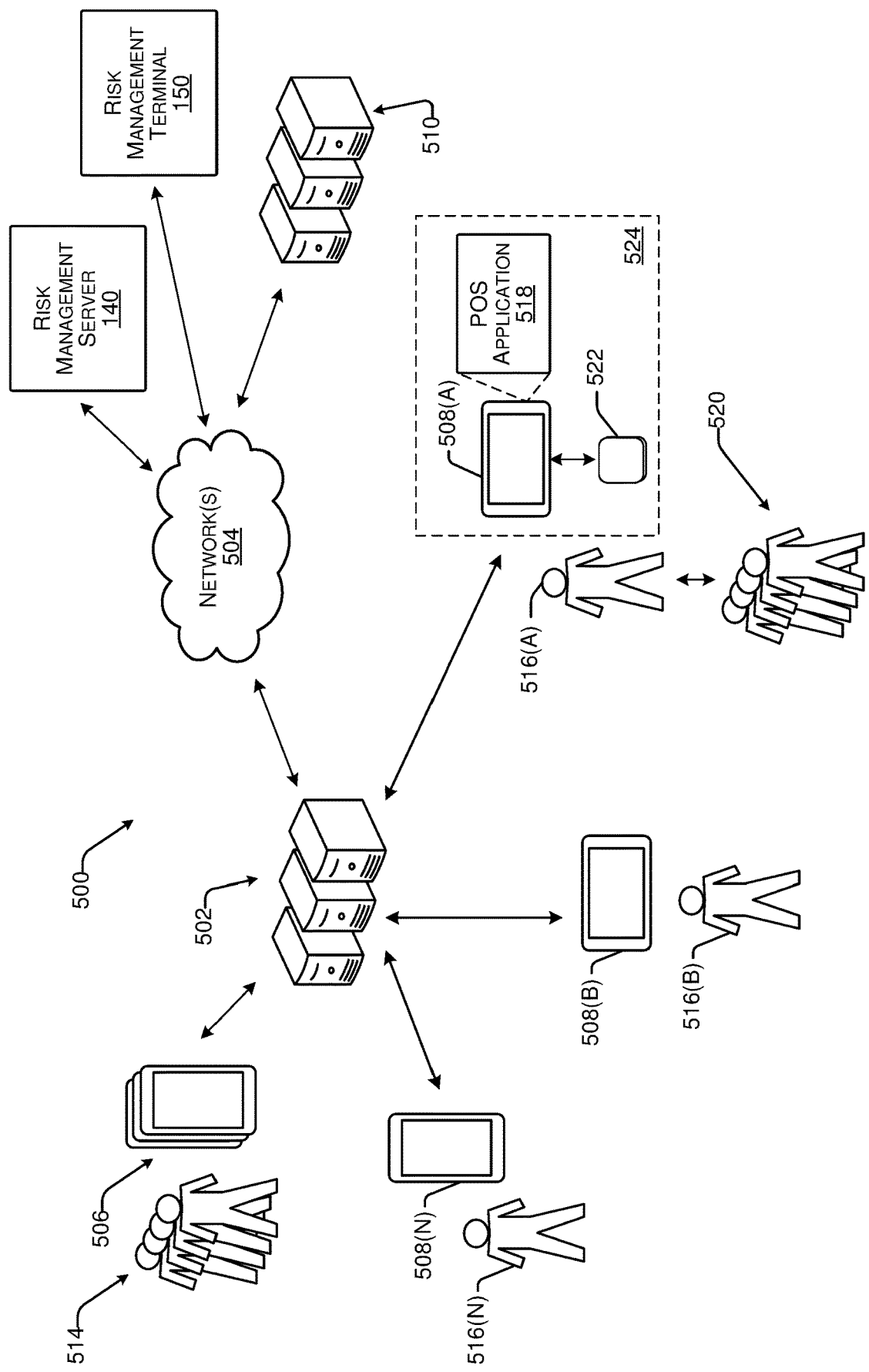
FIG. 5 is a block diagram illustrating an example point-of-sale system environment, in accordance with some embodiments.

FIG. 5 illustrates an example environment 500. The environment 500 includes server(s) 502 that can communicate over a network 504 with user devices 506 (which, in some examples can be merchant devices 508 (individually, 508(A)-508(N))) and/or server(s) 510 associated with third-party service provider(s). The server(s) 502 can be associated with a service provider that can provide one or more services for the benefit of users 514, as described below. Actions attributed to the service provider can be performed by the server(s) 502. The server 502 may be an example of computing server 120 and various activities and services described in FIG. 5 may be examples of service providers 255 provided by the computing server 120. The environment 500 may include the risk management server 140 and the risk management terminal 150 for identifying suspicious user accounts and performing automatic account suspension and deactivation based on the process 200.

The environment 500 can include a plurality of user devices 506, as described above. Each one of the plurality of user devices 506 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 514. The users 514 can be referred to as customers, buyers, merchants, sellers, borrowers, employees, employers, payors, payees, couriers and so on. The users 514 can interact with the user devices 506 via user interfaces presented via the user devices 506. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 506 can have an instance or versioned instance of an application, which can be downloaded from an application store, for example, which can present the user interface(s) described herein. In at least one example, a user 514 can interact with the user interface via touch input, spoken input, or any other type of input.

As described above, in at least one example, the users 514 can include merchants 516 (individually, 516(A)-516(N)). In an example, the merchants 516 can operate respective merchant devices 508, which can be user devices 506 configured for use by merchants 516. For the purpose of this discussion, a "merchant" can be any entity that offers items (e.g., goods or services) for purchase or other means of acquisition (e.g., rent, borrow, barter, etc.). The merchants 516 can offer items for purchase or other means of acquisition via brick-and-mortar stores, mobile stores (e.g., pop-up shops, food trucks, etc.), online stores, combinations of the foregoing, and so forth. In some examples, at least some of the merchants 516 can be associated with a same entity but can have different merchant locations and/or can have franchise/franchisee relationships. In additional or alternative examples, the merchants 516 can be different merchants. That is, in at least one example, the merchant 516(A) is a different merchant than the merchant 516(B) and/or the merchant 516(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 508 can have an instance of a POS application 518 stored thereon. The POS application 518 can configure the merchant device 508 as a POS terminal, which enables the merchant 516(A) to interact with one or more customers 520. As described above, the users 514 can include customers, such as the customers 520 shown as interacting with the merchant 516(A). For the purpose of this discussion, a "customer" can be any entity that acquires items from merchants. While only two customers 520 are illustrated in FIG. 5, any number of customers 520 can interact with the merchants 516. Further, while FIG. 5 illustrates the customers 520 interacting with the merchant 516(A), the customers 520 can interact with any of the merchants 516.

In some embodiments, various merchants 516 and customers 520 are examples of users 105 and their accounts may be monitored by the risk management server 140.

In at least one example, interactions between the customers 520 and the merchants 516 that involve the exchange of funds (from the customers 520) for items (from the merchants 516) can be examples of transactions. In at least one example, the POS application 518 can determine transaction data associated with the POS transactions. Transaction data can include payment information, which can be obtained from a reader device 522 associated with the merchant device 508(A), user authentication data, purchase amount information, point-of-purchase information (e.g., item(s) purchased, date of purchase, time of purchase, etc.), etc. The POS application 518 can send transaction data to the server(s) 502 such that the server(s) 502 can track transactions of the customers 520, merchants 516, and/or any of the users 514 over time. Furthermore, the POS application 518 can present a UI to enable the merchant 516(A) to interact with the POS application 518 and/or the service provider via the POS application 518.

In at least one example, the merchant device 508(A) can be a special-purpose computing device configured as a POS terminal (via the execution of the POS application 518). In at least one example, the POS terminal may be connected to a reader device 522, which is capable of accepting a variety of payment instruments, such as credit cards, debit cards, gift cards, short-range communication based payment instruments, and the like, as described below. In at least one example, the reader device 522 can plug in to a port in the merchant device 508(A), such as a microphone port, a headphone port, an audio-jack, a data port, or other suitable port. In additional or alternative examples, the reader device 522 can be coupled to the merchant device 508(A) via another wired or wireless connection, such as via a Bluetooth®, BLE, and so on. Additional details are described below with reference to FIG. 8. In some examples, the reader device 522 can read information from alternative payment instruments including, but not limited to, wristbands and the like.

In some examples, the reader device 522 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 522, and communicate with the server(s) 502, which can provide, among other services, a payment processing service. The server(s) 502 associated with the service provider can communicate with server(s) 510, as described below. In this manner, the POS terminal and reader device 522 may collectively process transaction(s) between the merchants 516 and customers 520. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 522 of the POS system 524 are shown as separate devices, in additional or alternative examples, the POS terminal and the reader device 522 can be part of a single device. In some examples, the reader device 522 can have a display integrated therein for presenting information to the customers 520. In additional or alternative examples, the POS terminal can have a display integrated therein for presenting information to the customers 520. POS systems, such as the POS system 524, may be mobile, such that POS terminals and reader devices may process transactions in disparate locations across the world. POS systems can be used for processing card-present transactions and card-not-present (CNP) transactions, as described below.

A card-present transaction is a transaction where both a customer 520 and his or her payment instrument are physically present at the time of the transaction. Card-present transactions may be processed by swipes, dips, taps, or any other interaction between a physical payment instrument (e.g., a card), or otherwise present payment instrument, and a reader device 522 whereby the reader device 522 is able to obtain payment data from the payment instrument. A swipe is a card-present transaction where a customer 520 slides a card, or other payment instrument, having a magnetic strip through a reader device 522 that captures payment data contained in the magnetic strip. A dip is a card-present transaction where a customer 520 inserts a payment instrument having an embedded microchip (i.e., chip) into a reader device 522 first. The dipped payment instrument remains in the payment reader until the reader device 522 prompts the customer 520 to remove the card, or other payment instrument. While the payment instrument is in the reader device 522, the microchip can create a one-time code which is sent from the POS system 524 to the server(s) 510 (which can be associated with third-party service providers that provide payment services, including but not limited to, an acquirer bank, an issuer, and/or a card payment network (e.g., Mastercard®), VISAR, etc.)) to be matched with an identical one-time code. A tap is a card-present transaction where a customer 520 may tap or hover his or her payment instrument (e.g., card, electronic device such as a smart phone running a payment application, etc.) over a reader device 522 to complete a transaction via short-range communication (e.g., NFC, RFID, Bluetooth®, BLE, etc.). Short-range communication enables the payment instrument to exchange information with the reader device 522. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 524, the server(s) 502, and/or the server(s) 510 may exchange payment information and transaction data to determine whether transactions are authorized. For example, the POS system 524 may provide encrypted payment data, user authentication data, purchase amount information, point-of-purchase information, etc. (collectively, transaction data) to server(s) 502 over the network(s) 504. The server(s) 502 may send the transaction data to the server(s) 510. As described above, in at least one example, the server(s) 510 can be associated with third-party service providers that provide payment services, including but not limited to, an acquirer bank, an issuer, and/or a card payment network (e.g., Mastercard®, VISAR, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 510 associated therewith) can send a fund transfer request to a server computing device of a card payment network (e.g., Mastercard®, VISAR, etc.) to determine whether the transaction is authorized or deficient. In at least one example, the service provider can serve as an acquirer and connect directly with the card payment network.

The card payment network (e.g., the server(s) 510 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 510 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 510 associated therewith), and a payment authorization message is communicated from the issuer to the POS device via a path opposite of that described above, or via an alternate path.

As described above, the server(s) 510, which can be associated with payment service provider(s), may determine whether the transaction is authorized based on the transaction data, as well as information relating to parties to the transaction (e.g., the customer 520 and/or the merchant 516(A)). The server(s) 510 may send an authorization notification over the network(s) 504 to the server(s) 502, which may send the authorization notification to the POS system 524 over the network(s) 504 to indicate whether the transaction is authorized. The server(s) 502 may also transmit additional information such as transaction identifiers to the POS system 524. In one example, the server(s) 502 may include a merchant application and/or other functional components for communicating with the POS system 524 and/or the server(s) 510 to authorize or decline transactions.

Based on the authentication notification that is received by the POS system 524 from server(s) 502, the merchant 516(A) may indicate to the customer 520 whether the transaction has been approved. In some examples, approval may be indicated at the POS system 524, for example, at a display of the POS system 524. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 514 can access all of the services of the service provider. In other examples, the users 514 can have gradated access to the services, which can be based on risk tolerance, IDV outputs, subscriptions, and so on. In at least one example, access to such services can be availed to the merchants 516 via the POS application 518. In additional or alternative examples, each service can be associated with its own access point (e.g., application, web browser, etc.). In some embodiments, if risk management server 140 determines that an account is suspicious, the risk management server 140 may suspend or deactivate one or more services described.

The service provider can offer payment processing services for processing payments on behalf of the merchants 516, as described above. For example, the service provider can provision payment processing software, payment processing hardware and/or payment processing services to merchants 516, as described above, to enable the merchants 516 to receive payments from the customers 520 when conducting POS transactions with the customers 520. For instance, the service provider can enable the merchants 516 to receive cash payments, payment card payments, and/or electronic payments from customers 520 for POS transactions and the service provider can process transactions on behalf of the merchants 516. In some embodiments, if risk management server 140 determines that an account is suspicious, the risk management server 140 may suspend or deactivate one or more services described.

As the service provider processes transactions on behalf of the merchants 516, the service provider can maintain accounts or balances for the merchants 516 in one or more ledgers. For example, the service provider can analyze transaction data received for a transaction to determine an amount of funds owed to a merchant 516(A) for the transaction. In at least one example, such an amount can be a total purchase price less fees charged by the service provider for providing the payment processing services. Based on determining the amount of funds owed to the merchant 516(A), the service provider can deposit funds into an account of the merchant 516(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument. In some embodiments, if risk management server 140 determines that an account is suspicious, the risk management server 140 may suspend or deactivate one or more services described.

A scheduled deposit can occur when the service provider transfers funds associated with a stored balance of the merchant 516(A) to a bank account of the merchant 516(A) that is held at a bank or other financial institution (e.g., associated with the server(s) 510). Scheduled deposits can occur at a prearranged time after a POS transaction is funded, which can be a business day after the POS transaction occurred, or sooner or later. In some examples, the merchant 516(A) can access funds prior to a scheduled deposit. For instance, the merchant 516(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 516(A) can have a payment instrument that is linked to the stored balance that enables the merchant to access the funds without first transferring the funds from the account managed by the service provider to the bank account of the merchant 516(A). In some embodiments, if risk management server 140 determines that an account is suspicious, the risk management server 140 may suspend or deactivate one or more services described.

In at least one example, the service provider may provide inventory management services. That is, the service provider may provide inventory tracking and reporting. Inventory management services may enable the merchant 516(A) to access and manage a database storing data associated with a quantity of each item that the merchant 516(A) has available (i.e., an inventory). Furthermore, in at least one example, the service provider can provide catalog management services to enable the merchant 516(A) to maintain a catalog, which can be a database storing data associated with items that the merchant 516(A) has available for acquisition (i.e., catalog management services). In at least one example, the catalog may include a plurality of data items and a data item of the plurality of data items may represent an item that the merchant 516(A) has available for acquisition. The service provider can offer recommendations related to pricing of the items, placement of items on the catalog, and multi-party fulfillment of the inventory. In some embodiments, if risk management server 140 determines that an account is suspicious, the risk management server 140 may suspend or deactivate one or more services described.

In at least one example, the service provider can provide business banking services, which allow the merchant 516(A) to track deposits (from payment processing and/or other sources of funds) into an account of the merchant 516(A), payroll payments from the account (e.g., payments to employees of the merchant 516(A)), payments to other merchants (e.g., business-to-business) directly from the account or from a linked debit card, withdrawals made via scheduled deposit and/or instant deposit, etc. Furthermore, the business banking services can enable the merchant 516(A) to obtain a customized payment instrument (e.g., credit card), check how much money they are carning (e.g., via presentation of available carned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 516 to visualize their cash flow to track their financial health, set aside money for upcoming obligations (e.g., savings), organize money around goals, etc. In some embodiments, if risk management server 140 determines that an account is suspicious, the risk management server 140 may suspend or deactivate one or more services described.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers. In some embodiments, if risk management server 140 determines that an account is suspicious, the risk management server 140 may suspend or deactivate one or more services described.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on. In some embodiments, if risk management server 140 determines that an account is suspicious, the risk management server 140 may suspend or deactivate one or more services described. Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 516. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan. In some embodiments, if risk management server 140 determines that an account is suspicious, the risk management server 140 may suspend or deactivate one or more services described.

The service provider can provide web-development services, which enable users 514 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 516. In at least one example, the service provider can recommend and/or generate content items to supplement omni-channel presences of the merchants 516. That is, if a merchant of the merchants 516 has a web page, the service provider—via the web-development or other services—can recommend and/or generate additional content items to be presented via other channel(s), such as social media, email, etc. In some embodiments, if risk management server 140 determines that an account is suspicious, the risk management server 140 may suspend or deactivate one or more services described.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider. In some embodiments, if risk management server 140 determines that an account is suspicious, the risk management server 140 may suspend or deactivate one or more services described.

Moreover, in at least one example, the service provider can provide employee management services for managing schedules of employees. Further, the service provider can provide appointment services for enabling users 514 to set schedules for scheduling appointments and/or users 514 to schedule appointments. In some embodiments, if risk management server 140 determines that an account is suspicious, the risk management server 140 may suspend or deactivate one or more services described.

In some examples, the service provider can provide restaurant management services to enable users 514 to make and/or manage reservations, to monitor front-of-house and/or back-of-house operations, and so on. In such examples, the merchant device(s) 508 and/or server(s) 502 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant. In some embodiments, if risk management server 140 determines that an account is suspicious, the risk management server 140 may suspend or deactivate one or more services described.

In at least one example, the service provider can provide fulfilment services, which can use couriers for delivery, wherein couriers can travel between multiple locations to provide delivery services, photography services, etc. Couriers can be users 514 who can travel between locations to perform services for a requesting user 514 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 506. In some embodiments, if risk management server 140 determines that an account is suspicious, the risk management server 140 may suspend or deactivate one or more services described.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer. In some embodiments, if risk management server 140 determines that an account is suspicious, the risk management server 140 may suspend or deactivate one or more services described.

In some examples, the service provider can enable conversational commerce via conversational commerce services, which can use one or more machine learning mechanisms to analyze messages exchanged between two or more users 514, voice inputs into a virtual assistant or the like, to determine intents of user(s) 514. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases. In some embodiments, if risk management server 140 determines that an account is suspicious, the risk management server 140 may suspend or deactivate one or more services described.

In at least one example, a user 514 may be new to the service provider such that the user 514 that has not registered (e.g., subscribed to receive access to one or more services offered by the service provider) with the service provider. The service provider can offer onboarding services for registering a potential user 514 with the service provider. In some examples, onboarding can involve presenting various questions, prompts, and the like to a potential user 514 to obtain information that can be used to generate a profile for the potential user 514. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 514 providing all necessary information, the potential user 514 can be onboarded to the service provider. In such an example, any limited or short-term access to services of the service provider can be transitioned to more permissive (e.g., less limited) or longer-term access to such services. In some embodiments, if risk management server 140 determines that an account is suspicious, the risk management server 140 may suspend or deactivate one or more services described.

The service provider can be associated with IDV services, which can be used by the service provider for compliance purposes and/or can be offered as a service, for instance to third-party service providers (e.g., associated with the server(s) 510). That is, the service provider can offer IDV services to verify the identity of users 514 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 514 accurately identifies the customer (or potential customer) (i.e., Is the customer who they say they are?). In some embodiments, if risk management server 140 determines that an account is suspicious, the risk management server 140 may suspend or deactivate one or more services described.

The service provider is capable of providing additional or alternative services and the services described above are offered as a sampling of services. In at least one example, the service provider can exchange data with the server(s) 510 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider. In some embodiments, if risk management server 140 determines that an account is suspicious, the risk management server 140 may suspend or deactivate one or more services described.

In at least one example, the service provider can be associated with a hub, such as an order hub, an inventory hub, a fulfillment hub and so on, which can enable integration with one or more additional service providers (e.g., associated with the additional server(s) 510). In some examples, such additional service providers can offer additional or alternative services and the service provider can provide an interface or other computer-readable instructions to integrate functionality of the service provider into the one or more additional service providers. In some embodiments, if risk management server 140 determines that an account is suspicious, the risk management server 140 may suspend or deactivate one or more services described.

Techniques described herein are directed to services provided via a distributed system of user devices 506 that are in communication with server(s) 502 of the service provider. That is, techniques described herein are directed to a specific implementation—or, a practical application—of utilizing a distributed system of user devices 506 that are in communication with server(s) 502 of the service provider to perform a variety of services, as described above. The unconventional configuration of the distributed system described herein enables the server(s) 502 that are remotely-located from end-users (e.g., users 514) to intelligently offer services based on aggregated data associated with the end-users, such as the users 514 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner. In some embodiments, if risk management server 140 determines that an account is suspicious, the risk management server 140 may suspend or deactivate one or more services described.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 514 and user devices 506. Furthermore, such features are changed dynamically based on the profiles of the users involved interacting with the GUIs. As such, techniques described herein are directed to improvements to computing systems.

Example Mobile Transaction System Environment

Figure 6:
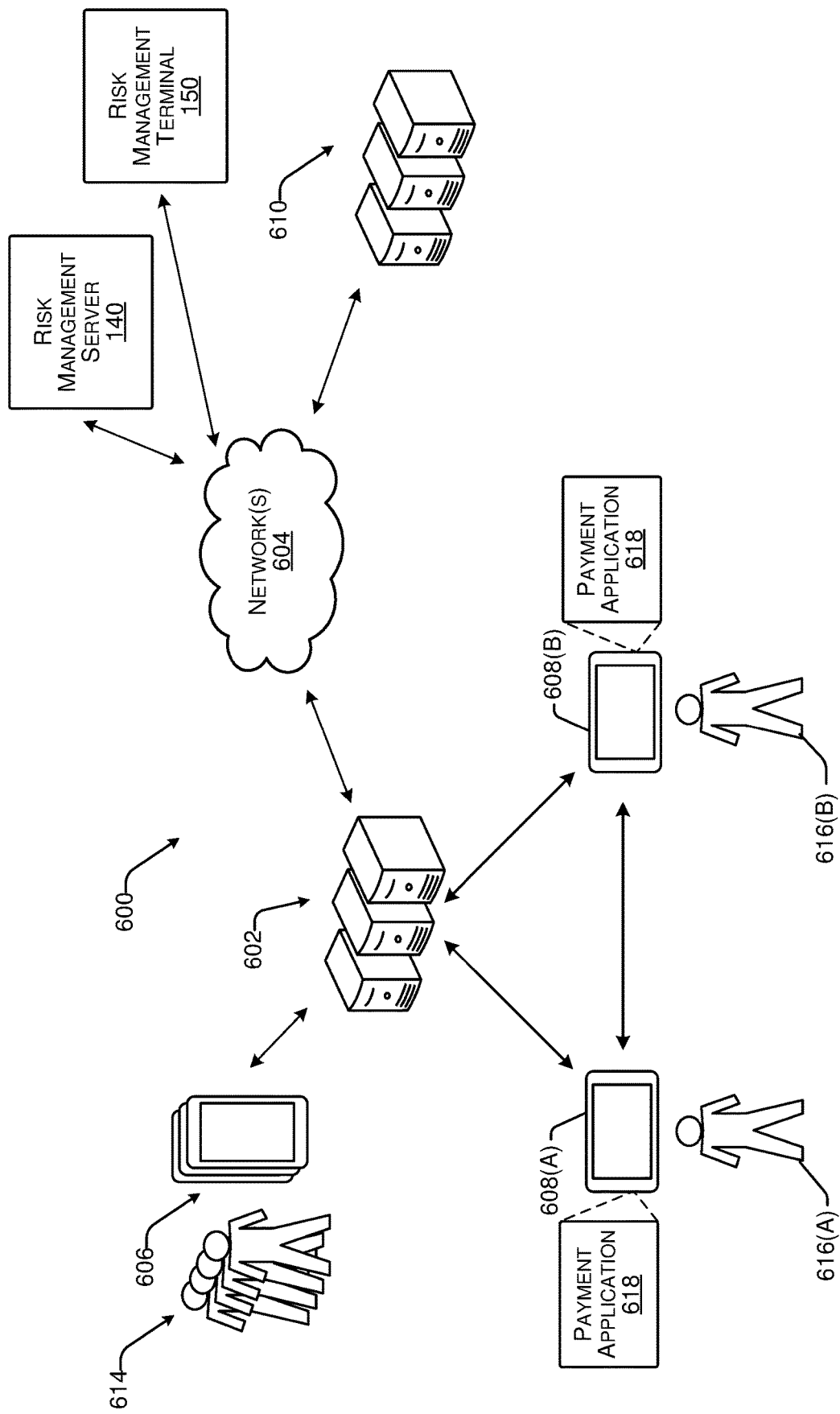
FIG. 6 is a block diagram illustrating an example mobile transaction system environment, in accordance with some embodiments.

FIG. 6 illustrates an example environment 600. The environment 600 includes server(s) 602 that can communicate over a network 604 with user devices 606 (which, in some examples can be user devices 608 (individually, 608(A), 608(B)) and/or server(s) 610 associated with third-party service provider(s). The server(s) 602 can be associated with a service provider that can provide one or more services for the benefit of users 614, as described below. Actions attributed to the service provider can be performed by the server(s) 602. In some examples, the service provider referenced in FIG. 5 can be the same or different than the service provider referenced in FIG. 6. The server 602 may be an example of computing server 120 and various activities and services described in FIG. 6 may be examples of service providers 255 provided by the computing server 120. The environment 600 may include the risk management server 140 and the risk management terminal 150 for identifying suspicious user accounts and performing automatic account suspension and deactivation based on the process 200.

The environment 600 can include a plurality of user devices 606, as described above. Each one of the plurality of user devices 606 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 614. The users 614 can be referred to as customers, buyers, merchants, sellers, borrowers, employees, employers, payors, payees, couriers and so on. The users 614 can interact with the user devices 606 via user interfaces presented via the user devices 606. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 606 can have an instance or versioned instance of an application, which can be downloaded from an application store, for example, which can present the user interface(s) described herein. In at least one example, a user 614 can interact with the user interface via touch input, spoken input, or any other type of input.

In at least one example, the service provider can provide a peer-to-peer payment service that enables peer-to-peer payments between two or more users 614. Two users, user 616(A) and user 616(B) are illustrated in FIG. 6 as "peers" in a peer-to-peer payment. In at least one example, the service provider can communicate with instances of a payment application 618 (or other access point) installed on devices 606 configured for operation by users 614. In an example, an instance of the payment application 618 executing on a first device 608(A) operated by a payor (e.g., user 616(A)) can send a request to the service provider to transfer an asset (e.g., fiat currency, non-fiat currency, digital assets, cryptocurrency, securities, gift cards, and/or related assets) from the payor to a payee (e.g., user 616(B)) via a peer-to-peer payment. In some examples, assets associated with an account of the payor are transferred to an account of the payee. In some examples, assets can be held at least temporarily in an account of the service provider prior to transferring the assets to the account of the payee.

In some embodiments, various users 614 and 616 are examples of users 105 and their accounts may be monitored by the risk management server 140.

Figure 7:
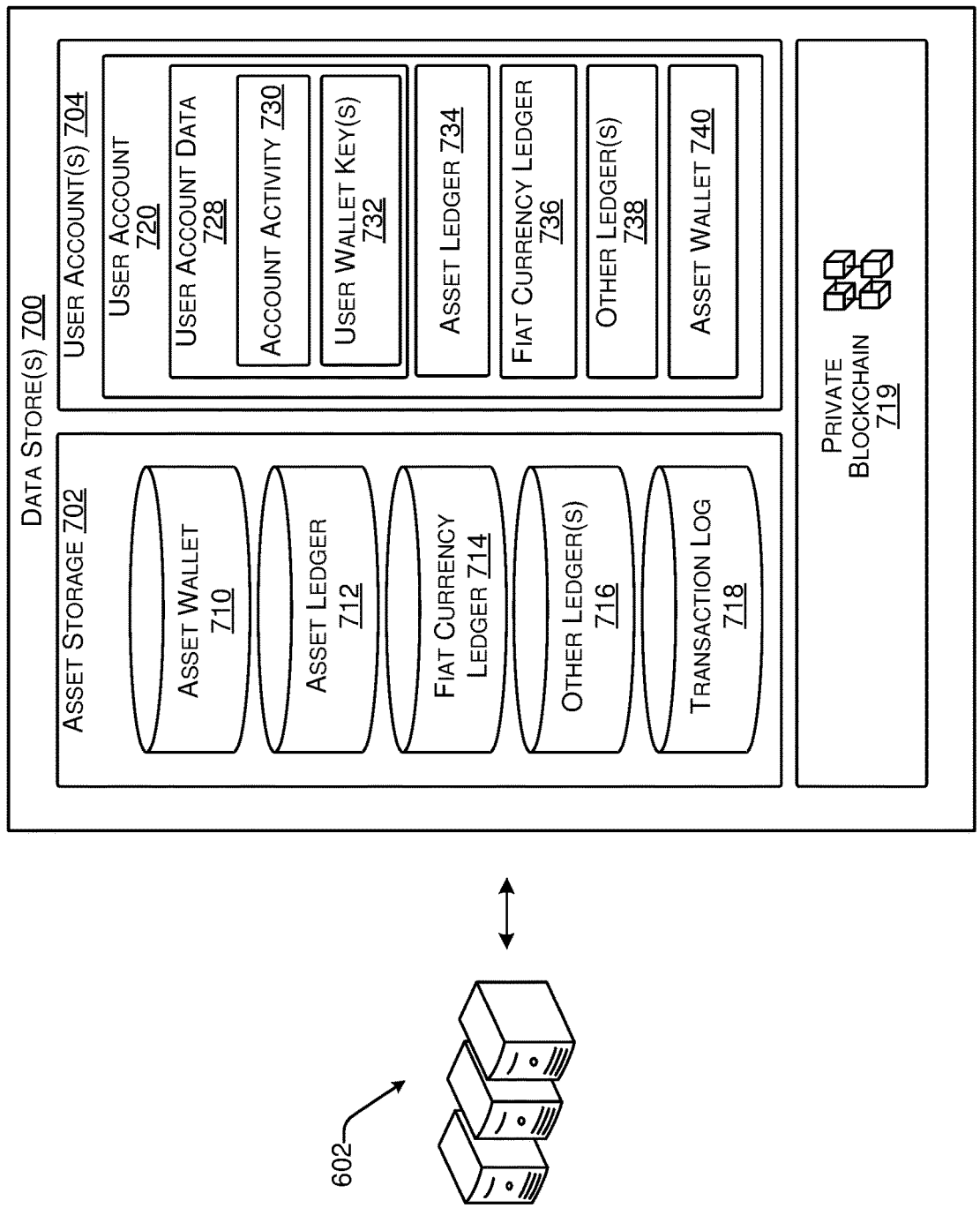
FIG. 7 is a block diagram illustrating an example ledger system environment, in accordance with some embodiments.

In some examples, the service provider can utilize a ledger system to track transfers of assets between users 614. FIG. 7, below, provides additional details associated with such a ledger system. The ledger system can enable users 614 to own fractional shares of assets that are not conventionally available. For instance, a user can own a fraction of a Bitcoin or a stock. Additional details are described herein. In some embodiments, if risk management server 140 determines that an account is suspicious, the risk management server 140 may suspend or deactivate one or more services described.

In at least one example, the service provider can facilitate transfers and can send notifications related thereto to instances of the payment application 618 executing on user device(s) of payee(s). As an example, the service provider can transfer assets from an account of user 616(A) to an account of the user 616(B) and can send a notification to the user device 608(B) of the user 616(B) for presentation via a user interface. The notification can indicate that a transfer is in process, a transfer is complete, or the like. In some examples, the service provider can send additional or alternative information to the instances of the payment application 618 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network. In some embodiments, if risk management server 140 determines that an account is suspicious, the risk management server 140 may suspend or deactivate one or more services described.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 602 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process. In some embodiments, if risk management server 140 determines that an account is suspicious, the risk management server 140 may suspend or deactivate one or more services described.

In some examples, the peer-to-peer payment process can be initiated through instances of the payment application 618 executing on the user devices 606. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash. In some embodiments, if risk management server 140 determines that an account is suspicious, the risk management server 140 may suspend or deactivate one or more services described.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 6 or a third-party service provider associated with the server(s) 610. In examples where the content provider is a third-party service provider, the server(s) 610 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc. In some embodiments, if risk management server 140 determines that an account is suspicious, the risk management server 140 may suspend or deactivate one or more services described.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 6. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 606 (e.g., mobile device or conventional personal computer (PC)) based on instructions transmitted to and from the server(s) 602 (which, in such an example can be called a "messaging server"). In some instances, the messaging application can include a payment application with messaging capability that enables users of the payment application to communicate with one another. In such instances, the payment application can be executed on a user device 606 based on instructions transmitted to and from the server(s) 602 (e.g., the payment service discussed in this description or another payment service that supports payment transactions). In some examples, the messaging application can be provided by a third-party service provider associated with the server(s) 610. In examples where the messaging application is a third-party service provider, the server(s) 610 can be accessible via one or more APIs or other integrations. In some embodiments, if risk management server 140 determines that an account is suspicious, the risk management server 140 may suspend or deactivate one or more services described.

As described above, the service provider can facilitate peer-to-peer transactions, which can enable users 614 to transfer fiat currency, non-fiat currency, cryptocurrency, securities, or other assets, or portions thereof, to other users 614. In at least one example, individual users can be associated with user accounts. Additional details associated with user accounts and the transfer of assets between users 614 are described below with reference to FIG. 7. In some embodiments, if risk management server 140 determines that an account is suspicious, the risk management server 140 may suspend or deactivate one or more services described.

Furthermore, the service provider of FIG. 6 can enable users 614 to perform banking transactions via instances of the payment application 618. For example, users can configure direct deposits or other deposits for adding assets to their various ledgers/balances. Further, users 614 can configure bill pay, recurring payments, and/or the like using assets associated with their accounts. In addition to sending and/or receiving assets via peer-to-peer transactions, users 614 buy and/or sell assets via asset networks such as cryptocurrency networks, securities networks, and/or the like. In some embodiments, if risk management server 140 determines that an account is suspicious, the risk management server 140 may suspend or deactivate one or more services described.

Example Ledger Systems

FIG. 7 illustrates example data store(s) 700 that can be associated with the server(s) 602. The user accounts 704 may be example user accounts 250 that are monitored by the risk management server 140.

In at least one example, the data store(s) 700 can store assets in an asset storage 702, as well as data in user account(s) 704. In some examples, user account(s) 704 can include merchant account(s) 706, and/or customer account(s) 708. In at least one example, the asset storage 702 can be used to store assets managed by the service provider of FIG. 6. In at least one example, the asset storage 702 can be used to record whether individual of the assets are registered to users. For example, the asset storage 702 can include an asset wallet 710 for storing records of assets owned by the service provider of FIG. 6, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 610 can be associated therewith. In some examples, the asset wallet 710 can communicate with the asset network via one or more components associated with the server(s) 602.

The asset wallet 710 can be associated with one or more addresses and can vary addresses used to acquire assets (e.g., from the asset network(s)) so that its holdings are represented under a variety of addresses on the asset network. In examples where the service provider of FIG. 6 has its own holdings of cryptocurrency (e.g., in the asset wallet 710), a user can acquire cryptocurrency directly from the service provider of FIG. 6. In some examples, the service provider of FIG. 6 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 702 may contain ledgers that store records of assignments of assets to users 614. Specifically, the asset storage 702 may include asset ledger 712, fiat currency ledger 714, and other ledger(s) 716, which can be used to record transfers of assets between users 614 of the service provider and/or one or more third-parties (e.g., merchant network(s), payment card network(s), ACH network(s), equities network(s), the asset network, securities networks, etc.). In doing so, the asset storage 702 can maintain a running balance of assets managed by the service provider of FIG. 6. The ledger(s) of the asset storage 702 can further indicate some of the running balance for each of the ledger(s) stored in the asset storage 702 is assigned or registered to one or more user account(s) 704.

In at least one example, the asset storage 702 can include transaction logs 718, which can include records of past transactions involving the service provider of FIG. 6. In at least one example, transaction data, as described herein, can be stored in association with the transaction logs 718.

In some examples, the data store(s) 700 can store a private blockchain 719. A private blockchain 719 can function to record sender addresses, recipient addresses, public keys, values of cryptocurrency transferred, and/or can be used to verify ownership of cryptocurrency tokens to be transferred. In some examples, the service provider of FIG. 6 can record transactions taking place within the service provider of FIG. 6 involving cryptocurrency until the number of transactions has exceeded a determined limit (e.g., number of transactions, storage space allocation, etc.). Based at least in part on determining that the limit has been reached, the service provider of FIG. 6 can publish the transactions in the private blockchain 719 to a public blockchain (e.g., associated with the asset network), where miners can verify the transactions and record the transactions to blocks on the public blockchain. In at least one example, the service provider of FIG. 6 can participate as miner(s) at least for its transactions to be posted to the public blockchain.

In at least one example, the data store(s) 700 can store and/or manage accounts, such as user account(s) 704, merchant account(s) 506, and/or customer account(s) 508. In at least one example, the user account(s) 704 may store records of user accounts associated with the users 614. In at least one example, the user account(s) 704 can include a user account 720, which can be associated with a user (of the users 614). Other user accounts of the user account(s) 704 can be similarly structured to the user account 720, according to some examples. In other examples, other user accounts may include more or less data and/or account information than that provided by the user account 720. In at least one example, the user account 720 can include user account data 728, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 728 can include account activity 730 and user wallet key(s) 732. The account activity 730 may include a transaction log for recording transactions associated with the user account 720. In some examples, the user wallet key(s) 732 can include a public-private key-pair and a respective address associated with the asset network or other asset networks. In some examples, the user wallet key(s) 732 may include one or more key pairs, which can be unique to the asset network or other asset networks.

In addition to the user account data 728, the user account 720 can include ledger(s) for account(s) managed by the service provider of FIG. 6, for the user. For example, the user account 720 may include an asset ledger 734, a fiat currency ledger 736, and/or one or more other ledgers 738. The ledger(s) can indicate that a corresponding user utilizes the service provider of FIG. 6 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 6.

In some examples, the asset ledger 734 can store a balance for each of one or more cryptocurrencies (e.g., Bitcoin, Ethereum, Litecoin, etc.) registered to the user account 720.

In at least one example, the asset ledger 734 can further record transactions of cryptocurrency assets associated with the user account 720. For example, the user account 720 can receive cryptocurrency from the asset network using the user wallet key(s) 732. In some examples, the user wallet key(s) 732 may be generated for the user upon request. User wallet key(s) 732 can be requested by the user in order to send, exchange, or otherwise control the balance of cryptocurrency held by the service provider of FIG. 6 (e.g., in the asset wallet 710) and registered to the user. In some examples, the user wallet key(s) 732 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 6 and the value is credited as a balance in asset ledger 734), by purchasing currency in the form associated with the account using currency in a different form (e.g., buying a value of cryptocurrency from the service provider of FIG. 6 using a value of fiat currency reflected in fiat currency ledger 736, and crediting the value of cryptocurrency in asset ledger 734), or by conducting a transaction with another user (customer or merchant) of the service provider of FIG. 6 wherein the account receives incoming currency (which can be in the form associated with the account or a different form, in which the incoming currency may be converted to the form associated with the account). In some examples, the user account data 728 can include preferences for maintaining balances of individual of the ledgers. For example, the service provider of FIG. 6 can automatically debit the fiat currency ledger 736 to increase the asset ledger 734, or another account associated with the user whenever the cryptocurrency balance (e.g., of the asset ledger 734) falls below a stated level (e.g., a threshold). Conversely, in some embodiments, the service provider of FIG. 6 can automatically credit the fiat currency ledger 736 to decrease the asset ledger 734 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 6 (i.e., an external account). In at least one example, the user can transfer all or a portion of a balance of the cryptocurrency stored in the third-party cryptocurrency wallet to the service provider of FIG. 6. Such a transaction can require the user to transfer an amount of the cryptocurrency in a message signed by user's private key to an address provided by the service provider of FIG. 6. In at least one example, the transaction can be sent to miners to bundle the transaction into a block of transactions and to verify the authenticity of the transactions in the block. Once a miner has verified the block, the block is written to a public, distributed blockchain where the service provider of FIG. 6 can then verify that the transaction has been confirmed and can credit the user's asset ledger 734 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 6. As described above, in some examples, the service provider of FIG. 6 can acquire cryptocurrency from a third-party source. In such examples, the asset wallet 710 can be associated with different addresses and can vary addresses used to acquire cryptocurrency so that its holdings are represented under a variety of addresses on a blockchain. When the service provider of FIG. 6 has their own holdings of cryptocurrency, users can acquire cryptocurrency directly from the service provider of FIG. 6. In some examples, the service provider of FIG. 6 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 6 has its own cryptocurrency assets, cryptocurrency transferred in a transaction (e.g., data with address provided for receipt of transaction and a balance of cryptocurrency transferred in the transaction) can be stored in the asset wallet 710. In at least one example, the service provider of FIG. 6 can credit the asset ledger 734 of the user. Additionally, while the service provider of FIG. 6 recognizes that the user retains the value of the transferred cryptocurrency through crediting the asset ledger 734, any person that inspects the blockchain will see the cryptocurrency as having been transferred to the service provider of FIG. 6. In some examples, the asset wallet 710 can be associated with many different addresses. In such examples, any person that inspects the blockchain may not easily associate all cryptocurrency stored in asset wallet 710 as belonging to the same entity. It is this presence of a private ledger that is used for real-time transactions and maintained by the service provider of FIG. 6, combined with updates to the public ledger at other times, that allows for extremely fast transactions using cryptocurrency to be achieved. In some examples, the "private ledger" can refer to the asset ledger 712, which in some examples, can utilize the private blockchain 719, as described herein. The "public ledger" can correspond to a public blockchain associated with the asset network.

In at least one example, a user's asset ledger 734, fiat currency ledger 736, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 734. In some examples, a user can receive fiat currency or another currency in the form of payment for a transaction with another user. In at least one example, at least a portion of such funds can be converted into cryptocurrency by the service provider of FIG. 6 and used to fund the asset ledger 734 of the user.

As addressed above, in some examples, users can also have other accounts maintained by the service provider of FIG. 6. For example, a user can also have an account in U.S. dollars, which can be tracked, for example, via the fiat currency ledger 736. Such an account can be funded by transferring money from a bank account at a third-party bank to an account maintained by the service provider of FIG. 6 as is conventionally known. In some examples, a user can receive fiat currency in the form of payment for a transaction with another user. In such examples, at least a portion of such funds can be used to fund the fiat currency ledger 736.

In some examples, a user can have one or more internal payment cards registered with the service provider of FIG. 6. Internal payment cards can be linked to one or more of the accounts associated with the user account 720. In some embodiments, options with respect to internal payment cards can be adjusted and managed using an application (e.g., the payment application 618).

In at least one example, as described above, each ledger can correspond to an account of the user that is managed by the service provider of FIG. 6. In at least one example, individual of the accounts can be associated with a wallet or a stored balance for use in payment transactions, peer-to-peer transactions, payroll payments, etc.

In at least one example, the user account 720 can be associated with an asset wallet 740. The asset wallet 740 of the user can be associated with account information that can be stored in the user account data 728 and, in some examples, can be associated with the user wallet key(s) 732. In at least one example, the asset wallet 740 can store data indicating an address provided for receipt of a cryptocurrency transaction. In at least one example, the balance of the asset wallet 740 can be based at least in part on a balance of the asset ledger 734. In at least one example, funds availed via the asset wallet 740 can be stored in the asset wallet 740 or the asset wallet 710. Funds availed via the asset wallet 710 can be tracked via the asset ledger 734. The asset wallet 740, however, can be associated with additional cryptocurrency funds.

In at least one example, when the service provider of FIG. 6 includes a private blockchain 719 for recording and validating cryptocurrency transactions, the asset wallet 740 can be used instead of, or in addition to, the asset ledger 734. For example, at least one example, a merchant can provide the address of the asset wallet 740 for receiving payments. In an example where a customer is paying in cryptocurrency and the customer has their own cryptocurrency wallet account associated with the service provider of FIG. 6, the customer can send a message signed by its private key including its wallet address (i.e., of the customer) and identifying the cryptocurrency and value to be transferred to the merchant's asset wallet 740. The service provider of FIG. 6 can complete the transaction by reducing the cryptocurrency balance in the customer's cryptocurrency wallet and increasing the cryptocurrency balance in the merchant's asset wallet 740. In addition to recording the transaction in the respective cryptocurrency wallets, the transaction can be recorded in the private blockchain 719 and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can require a user to transfer an amount of cryptocurrency in a message signed by the user's private key to an address of the cryptocurrency wallet account. The transferred amount of cryptocurrency can then be within the cryptocurrency wallet account for use in later transactions.

While the asset ledger 734 and/or asset wallet 740 are each described above with reference to cryptocurrency, the asset ledger 734 and/or asset wallet 740 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 6 is an aspect of the technology disclosed that enables technical advantages of increased processing speed and improved security.

Figure 8:
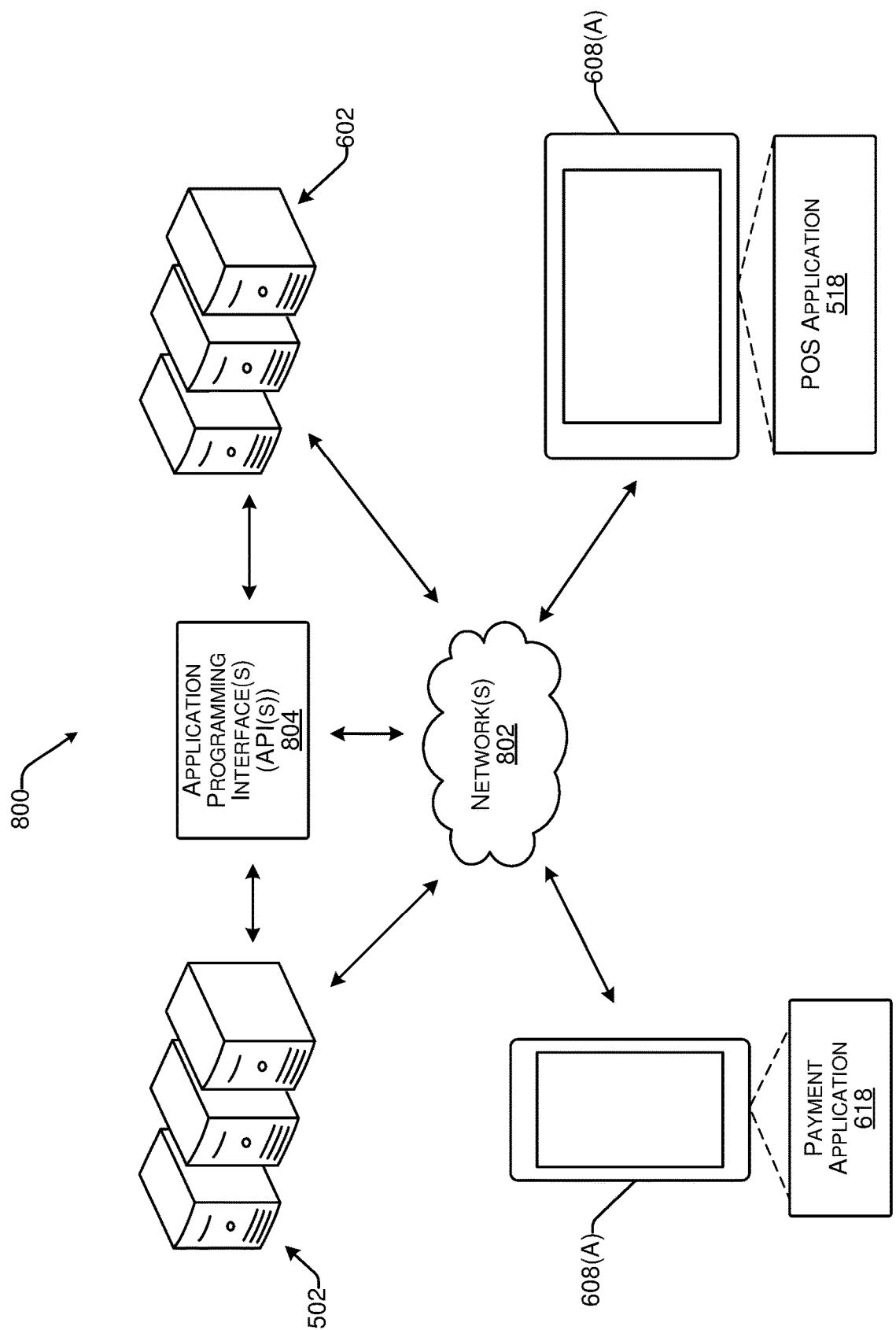
FIG. 8 is a block diagram illustrating an example environment that integrates point-of-sale using assets associated with user accounts in the peer-to-peer environment, in accordance with some embodiments.

FIG. 8 illustrates an example environment 800 wherein the environment 500 and the environment 600 can be integrated to enable payments at the point-of-sale using assets associated with user accounts in the peer-to-peer environment of FIG. 6. As illustrated, each of the components can communicate with one another via one or more networks 802. In some examples, one or more APIs 804 or other functional components can be used to facilitate such communication.

In at least one example, the example environment 800 can enable contactless payments, via integration of peer-to-peer payment, or other payment making, platform(s) and payment processing platform(s), are described herein. For the purpose of FIG. 8, the environment 500 can refer to a payment processing platform and the environment 600 can refer to a peer-to-peer payment, or payment making, platform. In an example, such an integration can enable a customer to participate in a transaction via their own computing device instead of interacting with a merchant device of a merchant, such as the merchant device 508(A). In such an example, the POS application 518, associated with a payment processing platform and executable by the merchant device 508(A) of the merchant, can present a Quick Response (QR) code, or other code that can be used to identify a transaction (e.g., a transaction code), in association with a transaction between the customer and the merchant. The QR code, or other transaction code, can be provided to the POS application 518 via an API associated with the peer-to-peer payment platform. In an example, the customer can utilize their own computing device, such as the user device 608(A), to capture the QR code, or the other transaction code, and to provide an indication of the captured QR code, or other transaction code, to server(s) 502 and/or server(s) 602.

Based at least in part on the integration of the peer-to-peer payment platform and the payment processing platform (e.g., via the API), the server(s) 502 and/or 602 associated with each can exchange communications with each other—and with a payment application 618 associated with the peer-to-peer payment platform and/or the POS application 518—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 608(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 608(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 518 and the payment application 618, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 608(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 518, associated with a payment processing platform, on the merchant device 508(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 508(A) can present a QR code, or other transaction code, that can be associated with a peer-to-peer payment platform. The customer can use a camera associated with the user device 608(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 518, associated with a payment processing platform, on the merchant device 508(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 518 can cause a text message with a resource locator (e.g., uniform resource locator (URL)) that can be associated with a peer-to-peer payment platform to be sent to the user device 608(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 608(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 518 of a merchant device 508(A) at a brick-and-mortar store of a merchant to a payment application 618 of a user device 608(A) of a customer to enable the customer to participate in a transaction via their own computing device. For instance, in a "scan to pay" example as described above, based at least in part on capturing the QR code, or other transaction code, via the user device 608(A), the payment processing platform can provide transaction data to the peer-to-peer payment platform for presentation via the payment application 618 on the user device 608(A). In some examples, the customer can watch items being added to their cart (e.g., via a user interface presented via the payment application). As an item is added to a virtual cart by the merchant—via the POS application 518 on the merchant device 508(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 618 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 608(A) during or after payment of the transaction.

In some examples, based at least in part on capturing the QR code, or other transaction code, the payment processing platform can provide transaction data to the peer-to-peer payment platform for presentation via the payment application 618 on the computing device of the customer, such as the user device 608(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 618 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 518, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 618 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Example Hardware Architecture

Figure 9:
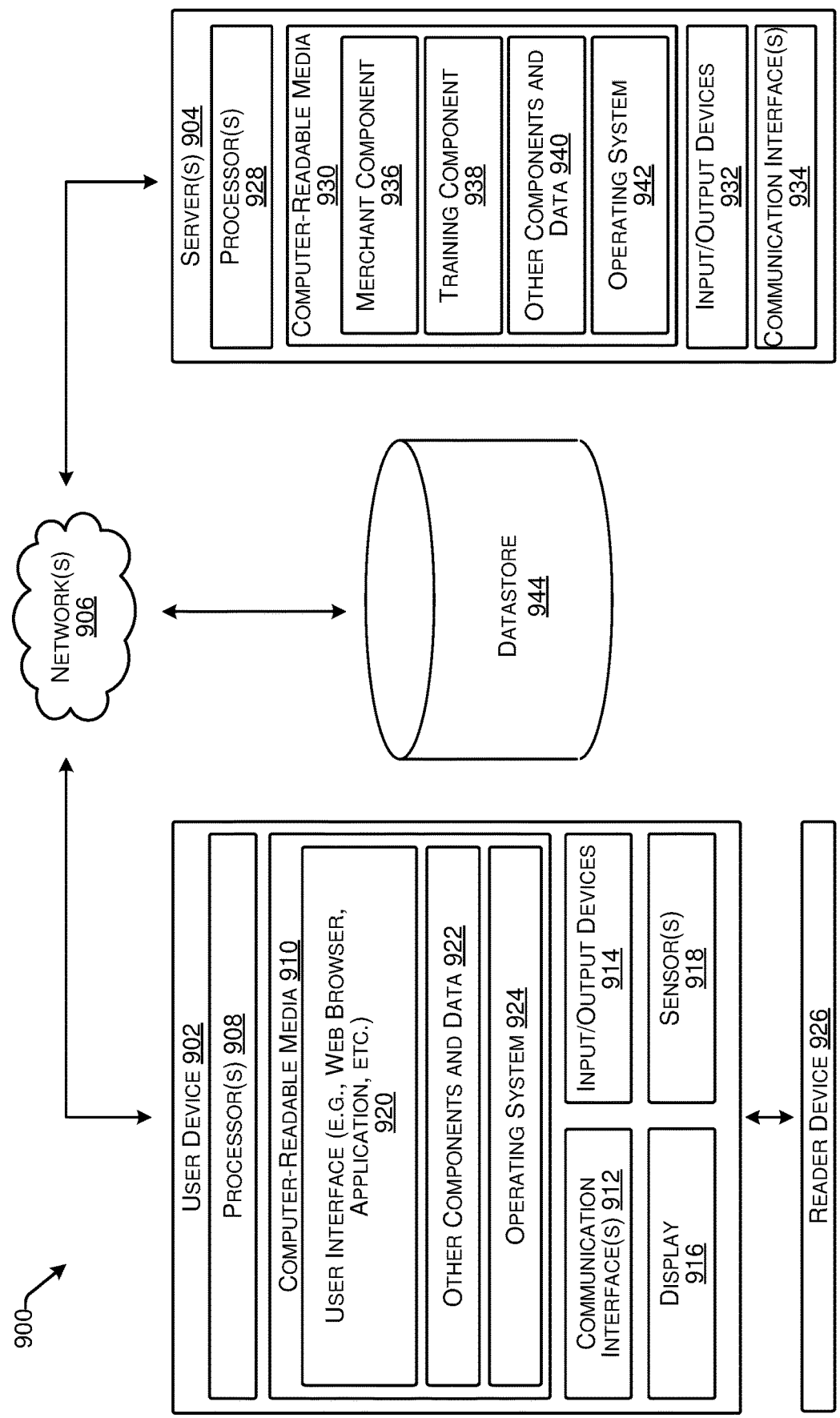
FIG. 9 is a block diagram illustrating a hardware system for performing techniques described herein, in accordance with some embodiments.

FIG. 9 depicts an illustrative block diagram illustrating a system 900 for performing techniques described herein. The system 900 includes a user device 902, that communicates with server computing device(s) (e.g., server(s) 904) via network(s) 906 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 902 is illustrated, in additional or alternate examples, the system 900 can have multiple user devices, as described above with reference to FIG. 6.

In at least one example, the user device 902 can be any suitable type of computing device, e.g., portable, semi-portable, semi-stationary, or stationary. Some examples of the user device 902 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 902 can be any computing device capable of sending communications and performing the functions according to the techniques described herein. The user device 902 can include devices, e.g., payment card readers, or components capable of accepting payments, as described below.

In the illustrated example, the user device 902 includes one or more processors 908, one or more computer-readable media 910, one or more communication interface(s) 912, one or more input/output (I/O) devices 914, a display 916, and sensor(s) 918.

In at least one example, each processor 908 can itself comprise one or more processors or processing cores. For example, the processor(s) 908 can be implemented as one or more microprocessors, microcomputers, microcontrollers, digital signal processors, central processing units, state machines, logic circuitries, and/or any devices that manipulate signals based on operational instructions. In some examples, the processor(s) 908 can be one or more hardware processors and/or logic circuits of any suitable type specifically programmed or configured to execute the algorithms and processes described herein. The processor(s) 908 can be configured to fetch and execute computer-readable processor-executable instructions stored in the computer-readable media 910.

Depending on the configuration of the user device 902, the computer-readable media 910 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 910 can include, but is not limited to, RAM, ROM, EEPROM, flash memory, solid-state storage, magnetic disk storage, optical storage, and/or other computer-readable media technology. Further, in some examples, the user device 902 can access external storage, such as RAID storage systems, storage arrays, network attached storage, storage area networks, cloud storage, or any other medium that can be used to store information and that can be accessed by the processor(s) 908 directly or through another computing device or network. Accordingly, the computer-readable media 910 can be computer storage media able to store instructions, components or components that can be executed by the processor(s) 908. Further, when mentioned, non-transitory computer-readable media exclude media such as energy, carrier signals, electromagnetic waves, and signals per se.

The computer-readable media 910 can be used to store and maintain any number of functional components that are executable by the processor(s) 908. In some implementations, these functional components comprise instructions or programs that are executable by the processor(s) 908 and that, when executed, implement operational logic for performing the actions and services attributed above to the user device 902. Functional components stored in the computer-readable media 910 can include a user interface 920 to enable users to interact with the user device 902, and thus the server(s) 904 and/or other networked devices. In at least one example, the user interface 920 can be presented via a web browser, or the like. In other examples, the user interface 920 can be presented via an application, such as a mobile application or desktop application, which can be provided by a service provider associated with the server(s) 904, or which can be an otherwise dedicated application. In some examples, the user interface 920 can be an example of dashboard 155. In at least one example, a user can interact with the user interface via touch input, spoken input, gesture, or any other type of input. The word "input" is also used to describe "contextual" input that may not be directly provided by the user via the user interface 920. For example, user's interactions with the user interface 920 are analyzed using, e.g., natural language processing techniques, to determine context or intent of the user, which may be treated in a manner similar to "direct" user input.

Depending on the type of the user device 902, the computer-readable media 910 can also optionally include other functional components and data, such as other components and data 922, which can include programs, drivers, etc., and the data used or generated by the functional components. In addition, the computer-readable media 910 can also store data, data structures and the like, that are used by the functional components. Further, the user device 902 can include many other logical, programmatic and physical components, of which those described are merely examples that are related to the discussion herein.

In at least one example, the computer-readable media 910 can include additional functional components, such as an operating system 924 for controlling and managing various functions of the user device 902 and for enabling basic user interactions.

The communication interface(s) 912 can include one or more interfaces and hardware components for enabling communication with various other devices, such as over the network(s) 906 or directly. For example, communication interface(s) 912 can enable communication through one or more network(s) 906, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 902 can further include one or more input/output (I/O) devices 914. The I/O devices 914 can include speakers, a microphone, a camera, and various user controls (e.g., buttons, a joystick, a keyboard, a keypad, etc.), a haptic output device, and so forth. The I/O devices 914 can also include attachments that leverage the accessories (audio-jack, USB-C, Bluetooth, etc.) to connect with the user device 902.

In at least one example, user device 902 can include a display 916. Depending on the type of computing device(s) used as the user device 902, the display 916 can employ any suitable display technology. For example, the display 916 can be a liquid crystal display, a plasma display, a light emitting diode display, an OLED (organic light-emitting diode) display, an electronic paper display, or any other suitable type of display able to present digital content thereon. In at least one example, the display 916 can be an augmented reality display, a virtually reality display, or any other display able to present and/or project digital content. In some examples, the display 916 can have a touch sensor associated with the display 916 to provide a touchscreen display configured to receive touch inputs for enabling interaction with a graphic interface presented on the display 916. Accordingly, implementations herein are not limited to any particular display technology. Alternatively, in some examples, the user device 902 may not include the display 916, and information can be presented by other means, such as aurally, haptically, etc.

In addition, the user device 902 can include sensor(s) 918. The sensor(s) 918 can include a GPS device able to indicate location information. Further, the sensor(s) 918 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users 614 enter a brick-and-mortar store of a merchant. Location can be used in additional or alternative ways as well.

Additionally, the user device 902 can include various other components that are not shown, examples of which include removable storage, a power source, such as a battery and power control unit, a barcode scanner, a printer, a cash drawer, and so forth.

In addition, in some examples, the user device 902 can include, be connectable to, or otherwise be coupled to a reader device 926, for reading payment instruments and/or identifiers associated with payment objects. In some examples, as described above, the reader device 926 can plug in to a port in the user device 902, such as a microphone port, a headphone port, an audio-jack, a data port, or other suitable port. In additional or alternative examples, the reader device 926 can be coupled to the user device 902 via another wired or wireless connection, such as via a Bluetooth®, BLE, and so on. The reader device 926 can include a read head for reading a magnetic strip of a payment card, and further can include encryption technology for encrypting the information read from the magnetic strip. Additionally or alternatively, the reader device 926 can be an EMV payment reader, which in some examples, can be embedded in the user device 902. Moreover, numerous other types of readers can be employed with the user device 902 herein, depending on the type and configuration of the user device 902.

The reader device 926 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 926 may include hardware implementation, such as slots, magnetic tracks, and rails with one or more sensors or electrical contacts to facilitate detection and acceptance of a payment instrument. That is, the reader device 926 may include hardware implementations to enable the reader device 926 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 926 may also include a biometric sensor to receive and process biometric characteristics and process them as payment instruments, given that such biometric characteristics are registered with the payment service and connected to a financial account with a bank server.

The reader device 926 may include processing unit(s), computer-readable media, a reader chip, a transaction chip, a timer, a clock, a network interface, a power supply, and so on. The processing unit(s) of the reader device 926 may execute one or more components and/or processes to cause the reader device 926 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 926, the computer-readable media may include volatile memory (such as RAM), non-volatile memory (such as ROM, flash memory, miniature hard drive, memory card, or the like), or some combination thereof. In at least one example, the computer-readable media of the reader device 926 may include at least one component for performing various functions as described herein.

The reader chip may perform functionalities to control the operations and processing of the reader device 926. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 906, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 926. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 902, which can be a POS terminal, and the reader device 926 are shown as separate devices, in additional or alternative examples, the user device 902 and the reader device 926 can be part of a single device, which may be a battery-operated device. In such an example, components of both the user device 902 and the reader device 926 may be associated with the single device. In some examples, the reader device 926 can have a display integrated therewith, which can be in addition to (or as an alternative of) the display 916 associated with the user device 902.

The server(s) 904 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 904 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 904 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 904 can include one or more processors 928, one or more computer-readable media 930, one or more I/O devices 932, and one or more communication interfaces 934. Each processor 928 can be a single processing unit or a number of processing units, and can include single or multiple computing units or multiple processing cores. The processor(s) 928 can be implemented as one or more microprocessors, microcomputers, microcontrollers, digital signal processors, central processing units, state machines, logic circuitries, and/or any devices that manipulate signals based on operational instructions. For example, the processor(s) 928 can be one or more hardware processors and/or logic circuits of any suitable type specifically programmed or configured to execute the algorithms and processes described herein. The processor(s) 928 can be configured to fetch and execute computer-readable instructions stored in the computer-readable media 930, which can program the processor(s) 928 to perform the functions described herein.

The computer-readable media 930 can include volatile and nonvolatile memory and/or removable and non-removable media implemented in any type of technology for storage of information, such as computer-readable instructions, data structures, program components, or other data. Such computer-readable media 930 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 904, the computer-readable media 930 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 930 can be used to store any number of functional components that are executable by the processor(s) 928. In many implementations, these functional components comprise instructions or programs that are executable by the processors 928 and that, when executed, specifically configure the one or more processors 928 to perform the actions attributed above to the service provider and/or payment processing service. Functional components stored in the computer-readable media 930 can optionally include a merchant component 936, a training component 938, and one or more other components and data 940.

The merchant component 936 can be configured to receive transaction data from POS systems, such as the POS system 524 described above with reference to FIG. 5. The merchant component 936 can transmit requests (e.g., authorization, capture, settlement, etc.) to payment service server computing device(s) to facilitate POS transactions between merchants and customers. The merchant component 936 can communicate the successes or failures of the POS transactions to the POS systems.

The training component 938 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 902 and/or the server(s) 904 for use at a time after the data models have been trained (e.g., at runtime).

The one or more other components and data 940 can include risk management engine that may perform risk management functionalities similar to the risk management server 140, the functionality of which is described, at least partially, above. Further, the one or more other components and data 940 can include programs, drivers, etc., and the data used or generated by the functional components. Further, the server(s) 904 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 930 can additionally include an operating system 942 for controlling and managing various functions of the server(s) 904.

The communication interface(s) 934 can include one or more interfaces and hardware components for enabling communication with various other devices, such as over the network(s) 906 or directly. For example, communication interface(s) 934 can enable communication through one or more network(s) 906, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 904 can further be equipped with various I/O devices 932. Such I/O devices 932 can include a display, various user interface controls (e.g., buttons, joystick, keyboard, mouse, touch screen, biometric or sensory input devices, etc.), audio speakers, connection ports and so forth.

In at least one example, the system 900 can include a datastore 944 that can be configured to store data that is accessible, manageable, and updatable. In some examples, the datastore 944 can be integrated with the user device 902 and/or the server(s) 904. In other examples, as shown in FIG. 9, the datastore 944 can be located remotely from the server(s) 904 and can be accessible to the server(s) 904. The datastore 944 can comprise multiple databases and/or servers connected locally and/or remotely via the network(s) 906.

In at least one example, the datastore 944 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 944 can store inventory database(s) and/or catalog database(s). As described above, an inventory can store data associated with a quantity of each item that a merchant has available to the merchant. Furthermore, a catalog can store data associated with items that a merchant has available for acquisition. The datastore 944 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

EXAMPLE EMBODIMENTS

In some embodiments, a computer-implemented method may include applying a trained risk model to a plurality of user accounts maintained by a service provider. The trained risk model may predict a likelihood for each of the plurality of user accounts that the user account is fraudulent. The computer-implemented method may also include identifying a plurality of suspicious user accounts from the plurality of user accounts based on the predicted likelihoods. The computer-implemented method may further include suspending each of the identified suspicious user accounts from using one or more features provided by the service provider. The computer-implemented method may further include curing one or more of the suspended user accounts responsive to a successful response to a challenge presented to a user associated with each of the suspended accounts. The computer-implemented method may further include confirming that each of the uncured suspended user accounts is fraudulent after a period of time without being cured. The computer-implemented method may further include creating training data including the cured user accounts labeled as not fraudulent and the confirmed user accounts labeled as fraudulent and re-training the risk model using the training data.

In some embodiments, the computer-implemented method may further include monitoring a suspension accuracy metric measuring an accuracy of suspending each of the identified suspicious user accounts from using the one or more features provided by the service provider. The computer-implemented method may further include deactivating, responsive to the suspension accuracy metric satisfying a threshold, each of the uncured suspended user accounts.

In some embodiments, suspending each of the identified suspicious user accounts from using the one or more features provided by the service provider may include identifying one or more identifiers associated with each of the identified suspicious user accounts and blocking new accounts associated with the one or more identifiers from creation.

In some embodiments, re-training the risk model using the training data may include applying, in a forward propagation of the risk model, the risk model to the training data to generate fraudulent or non-fraudulent predictions; comparing the fraudulent or non-fraudulent predictions to the fraudulent or non-fraudulent labels; and adjusting, in a backpropagation of the risk model, one or more parameters of the risk model.

In some embodiments, a system may include one or more processors and memory coupled to the one or more processors. The memory may be configured to store code including instructions. The instructions, when executed by the one or more processors, cause the one or more processors to perform steps including applying a trained risk model to a plurality of user accounts maintained by a service provider, the trained risk model predicting a likelihood for each of the plurality of user accounts that the user account is fraudulent. The steps may also include identifying a plurality of suspicious user accounts from the plurality of user accounts based on the predicted likelihoods. The steps may further include suspending each of the identified suspicious user accounts from using one or more features provided by the service provider. The step may further include re-training the risk model using results of challenges sent to each of the identified suspicious user accounts. The results indicate which of the identified suspicious user accounts are fraudulent.

In some embodiments, the trained risk model is applied periodically without active triggered activities from the plurality of user accounts.

In some embodiments, the steps may further include transmitting data related to the plurality of suspicious user accounts to a manual review. Suspending each of the identified suspicious user accounts from using the one or more features provided by the service provider may include suspending, responsive to the manual review determining that at least a subset of the identified suspicious user accounts are likely fraudulent, the plurality of suspicious user accounts in bulk.

In some embodiments, the techniques described herein relate to a system, the steps may further include monitoring a suspension accuracy metric measuring an accuracy of suspending each of the identified suspicious user accounts from using the one or more features provided by the service provider and deactivating, responsive to the suspension accuracy metric satisfying a threshold, each of the identified suspicious user accounts.

In some embodiments, deactivating each of the identified suspicious user accounts is carried out in a bulk operation.

In some embodiments, the suspension accuracy metric corresponds to a measure of a number of suspicious user accounts that are cured to a number of the suspicious user accounts that are uncured after a period of time.

In some embodiments, the steps may further include un-suspending, responsive to the suspension accuracy metric not satisfying a second threshold, one or more of the suspicious user accounts.

In some embodiments, the one or more features includes one or more of the following: account transactions using the service provider, peer-to-peer transactions, blockchain related transactions, or music streaming transactions.

In some embodiments, the steps may further include curing one or more of the suspended user accounts responsive to a successful response to a challenge presented to a user associated with each of the suspended accounts.

In some embodiments, the steps may further include adding a cured suspended user account to a cured account list, wherein the cured account list prevents the cured suspended user account from subsequent suspensions due to being subsequently identified by the trained risk model as being suspicious.

In some embodiments, the steps may further include confirming that each of uncured suspended user accounts is fraudulent after a period of time without being cured.

In some embodiments, the results are used to create training data including the cured user accounts labeled as not fraudulent and the uncured suspended user accounts labeled as fraudulent.

In some embodiments, the trained risk model is one of a plurality of risk models used by the service provider to identify suspicious user accounts, and the training data is used to train a second risk model in the plurality of risk models.

In some embodiments, suspending each of the identified suspicious user accounts from using the one or more features provided by the service provider may include identifying one or more identifiers associated with each of the identified suspicious user accounts and blocking new accounts associated with the one or more identifiers from creation.

In some embodiments, re-training the risk model using the results of challenges may include applying, in a forward propagation of the risk model, the risk model to training data to generate fraudulent or non-fraudulent predictions and comparing the fraudulent or non-fraudulent predictions to fraudulent or non-fraudulent labels of the training data; and adjusting, in a backpropagation of the risk model, one or more parameters of the risk model.

In some embodiments, a non-transitory computer-readable medium is configured to store code including instructions. The instructions, when executed by one or more processors, cause the one or more processors to perform steps including applying a trained risk model to a plurality of user accounts maintained by a service provider, the trained risk model predicting a likelihood for each of the plurality of user accounts that the user account is fraudulent; identifying a plurality of suspicious user accounts from the plurality of user accounts based on the predicted likelihoods; suspending each of the identified suspicious user accounts from using one or more features provided by the service provider; and re-training the risk model using results of challenges sent to each of the identified suspicious user accounts, wherein the results indicate which of the identified suspicious user accounts indicate which of the identified suspicious user accounts are fraudulent.

What is claimed is:

1. A computer-implemented method, comprising:
applying a trained risk model to a plurality of user accounts maintained by a service provider, the trained risk model predicting a likelihood for each of the plurality of user accounts that the user account is fraudulent;
identifying a plurality of suspicious user accounts from the plurality of user accounts based on the predicted likelihoods;
suspending each of the identified suspicious user accounts from using one or more features provided by the service provider;
curing one or more of the suspended user accounts responsive to a successful response from a user to a challenge presented to the user associated with respective ones of the one or more suspended user accounts, wherein at least one of the suspended user accounts is not cured;
confirming that each of the uncured suspended user accounts is fraudulent after a predetermined period of time without being cured;
creating new training data based on the curing and the confirming, wherein the new training data comprises the cured user accounts being labeled as not fraudulent and the confirmed user accounts being labeled as fraudulent;
determining a suspension accuracy metric based on a cure rate, the cure rate comprising a number of the one or more cured user accounts in view of a total number of the plurality of suspicious user accounts;
deactivating each of the uncured suspended user accounts based on the suspension accuracy metric; and
re-training the trained risk model using the new training data.

2. The computer-implemented method of claim 1, wherein suspending each of the identified suspicious user accounts from using the one or more features provided by the service provider comprises:
identifying one or more identifiers associated with each of the identified suspicious user accounts; and
blocking new accounts associated with the one or more identifiers from creation.

3. The computer-implemented method of claim 1, wherein re-training the trained risk model using the new training data comprising:
applying, in a forward propagation of the trained risk model, the trained risk model to the new training data to generate fraudulent or non-fraudulent predictions;
comparing the fraudulent or non-fraudulent predictions to the fraudulent or non-fraudulent labels; and
adjusting, in a backpropagation of the trained risk model, one or more parameters of the trained risk model.

4. A system comprising:
one or more processors; and
memory coupled to the one or more processors, the memory configured to store code comprising instructions, wherein the instructions, when executed by the one or more processors, cause the one or more processors to perform steps comprising:
applying a trained risk model to a plurality of user accounts maintained by a service provider, the trained risk model predicting a likelihood for each of the plurality of user accounts that the user account is fraudulent;

identifying a plurality of suspicious user accounts from the plurality of user accounts based on the predicted likelihoods;

suspending each of the identified suspicious user accounts from using one or more features provided by the service provider;

curing one or more of the suspended user accounts responsive to a successful response from a user to a challenge presented to the user associated with respective ones of the one or more suspended user accounts, wherein at least one of the suspended user accounts is not cured;

confirming that each of the uncured suspended user accounts is fraudulent after a predetermined period of time without being cured;

creating new training data based on the curing and the confirming, wherein the new training data comprises the cured user accounts being labeled as not fraudulent and the confirmed user accounts being labeled as fraudulent;

determining a suspension accuracy metric based on a cure rate, the cure rate comprising a number of the one or more cured user accounts in view of a total number of the plurality of suspicious user accounts;

deactivating each of the uncured suspended user accounts based on the suspension accuracy metric; and re-training the trained risk model using the new training data.

5. The system of claim 4, wherein the trained risk model is applied periodically without active triggered activities from the plurality of user accounts.

6. The system of claim 4, wherein the steps further comprise:

transmitting data related to the plurality of suspicious user accounts to a manual review;

wherein suspending each of the identified suspicious user accounts from using the one or more features provided by the service provider comprises, suspending, responsive to the manual review determining that at least a subset of the identified suspicious user accounts are likely fraudulent, the plurality of suspicious user accounts in bulk.

7. The system of claim 4, wherein deactivating each of the uncured suspended user accounts is carried out in a bulk operation.

8. The system of claim 4, wherein the steps further comprise:

un-suspending, responsive to the suspension accuracy metric not satisfying a second threshold, one or more of the suspicious user accounts.

9. The system of claim 4, wherein the one or more features comprises one or more of the following:

account transactions using the service provider,
peer-to-peer transactions,
blockchain related transactions, or
music streaming transactions.

10. The system of claim 4, wherein the steps further comprise:

adding a cured suspended user account to a cured account list, wherein the cured account list prevents the cured suspended user account from subsequent suspensions due to being subsequently identified by the trained risk model as being suspicious.

11. The system of claim 4, wherein the trained risk model is one of a plurality of risk models used by the service provider to identify suspicious user accounts, and the new training data is used to train a second risk model in the plurality of risk models.

12. The system of claim 4, wherein suspending each of the identified suspicious user accounts from using the one or more features provided by the service provider comprises:

identifying one or more identifiers associated with each of the identified suspicious user accounts; and blocking new accounts associated with the one or more identifiers from creation.

13. The system of claim 4, wherein re-training the trained risk model using the new training data comprises:

applying, in a forward propagation of the trained risk model, the trained risk model to training data to generate fraudulent or non-fraudulent predictions;

comparing the fraudulent or non-fraudulent predictions to fraudulent or non-fraudulent labels of the new training data; and adjusting, in a backpropagation of the trained risk model, one or more parameters of the trained risk model.

14. A non-transitory computer-readable medium configured to store code comprising instructions, wherein the instructions, when executed by one or more processors, cause the one or more processors to perform steps comprising:

applying a trained risk model to a plurality of user accounts maintained by a service provider, the trained risk model predicting a likelihood for each of the plurality of user accounts that the user account is fraudulent;

identifying a plurality of suspicious user accounts from the plurality of user accounts based on the predicted likelihoods;

suspending each of the identified suspicious user accounts from using one or more features provided by the service provider;

curing one or more of the suspended user accounts responsive to a successful response from a user to a challenge presented to the user associated with respective ones of the one or more suspended user accounts, wherein at least one of the suspended user accounts is not cured;

confirming that each of the uncured suspended user accounts is fraudulent after a predetermined period of time without being cured;

creating new training data based on the curing and the confirming, wherein the new training data comprises the cured user accounts being labeled as not fraudulent and the confirmed user accounts being labeled as fraudulent;

determining a suspension accuracy metric based on a cure rate, the cure rate comprising a number of the one or more cured user accounts in view of a total number of the plurality of suspicious user accounts;

deactivating each of the uncured suspended user accounts based on the suspension accuracy metric; and re-training the trained risk model using the new training data.

* * * * *